(12) United States Patent
Kondo et al.

(10) Patent No.: US 12,420,428 B2
(45) Date of Patent: Sep. 23, 2025

(54) BAKED OBJECT TAKING-OUT APPARATUS

(71) Applicant: Noritake Co., Limited, Nagoya (JP)

(72) Inventors: Hiromu Kondo, Nagoya (JP); Kenichi Tanaka, Nagoya (JP); Akira Sakai, Nagoya (JP); Hidetaka Kato, Nagoya (JP)

(73) Assignee: Noritake Co., Limited (JP)

( * ) Notice: Subject to any disclaimer, the term of this patent is extended or adjusted under 35 U.S.C. 154(b) by 704 days.

(21) Appl. No.: 17/656,740

(22) Filed: Mar. 28, 2022

(65) Prior Publication Data
US 2022/0307769 A1 Sep. 29, 2022

(30) Foreign Application Priority Data

Mar. 29, 2021 (JP) .................................. 2021-054569
Sep. 17, 2021 (JP) .................................. 2021-151705

(51) Int. Cl.
*B25J 11/00* (2006.01)
*A47J 44/00* (2006.01)

(52) U.S. Cl.
CPC ............. *B25J 11/008* (2013.01); *A47J 44/00* (2013.01); *B25J 11/0045* (2013.01)

(58) Field of Classification Search
CPC ...... A47J 44/00; B25J 11/0045; B25J 11/008; B25J 15/0033; B25J 15/0253
See application file for complete search history.

(56) References Cited

U.S. PATENT DOCUMENTS

| | | | | |
|---|---|---|---|---|
| 2016/0297081 A1* | 10/2016 | Watanabe | ............ | B25J 11/0045 |
| 2020/0306980 A1* | 10/2020 | Choi | ...................... | B25J 9/1697 |
| 2021/0260774 A1* | 8/2021 | Tao | ........................ | B25J 19/0025 |
| 2022/0031123 A1* | 2/2022 | He | ........................ | H05B 6/745 |
| 2022/0072730 A1* | 3/2022 | Bergmann | ............. | A22C 7/003 |
| 2022/0369676 A1* | 11/2022 | Poruks | ...................... | B25J 15/04 |

FOREIGN PATENT DOCUMENTS

| | | | | |
|---|---|---|---|---|
| DE | 202005000596 U1 * | 6/2005 | ............ | B21J 13/10 |
| JP | H06154582 A | 6/1994 | | |
| JP | 2006206338 A | 8/2006 | | |
| JP | 2008170139 A | 7/2008 | | |
| WO | 2020110405 A1 | 6/2020 | | |

\* cited by examiner

*Primary Examiner* — Reginald Alexander
(74) *Attorney, Agent, or Firm* — Gerald W. Roberts; John V. Daniluck; Dentons Bingham Greenebaum LLP

(57) ABSTRACT

The baked object taking-out apparatus is an apparatus that takes out a baked object from a baking base plate including a disposing surface on which the baked object is disposed. The baked object taking-out apparatus includes a robot arm, a holding member that is provided on the robot arm, that is formed of a metal material, and that is capable of holding the baking base plate, and a protective member that is formed at a portion of the holding member which comes into contact with the baking base plate and that is configured with a ceramic coating which contains a ceramic component.

4 Claims, 17 Drawing Sheets

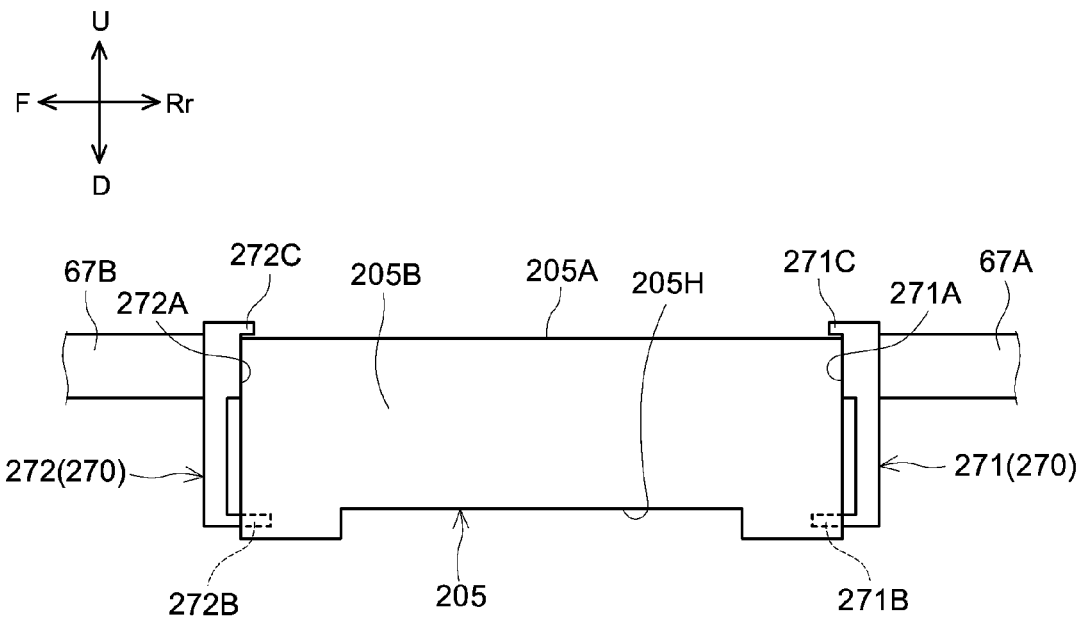
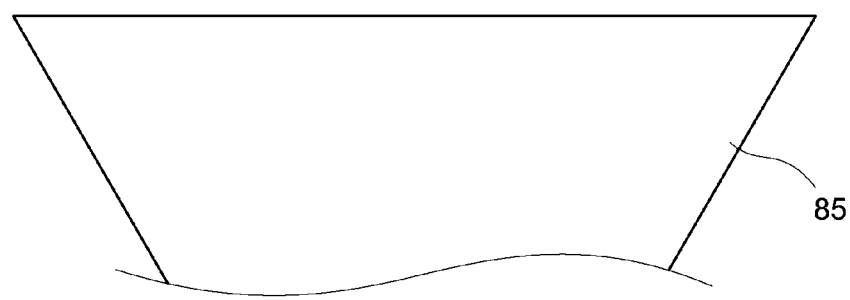
FIG.24

BAKED OBJECT TAKING-OUT APPARATUS

CROSS REFERENCE TO RELATED APPLICATION(S)

This application claims the benefit of priority of Japanese Patent Application No. 2021-054569, filed Mar. 29, 2021, and Japanese Patent Application No. 2021-151705, filed Sep. 17, 2021, both of which are incorporated herein by reference in their entireties.

FIELD OF THE INVENTION

The present disclosure relates to a baked object taking-out apparatus.

BACKGROUND OF THE INVENTION

Japanese Patent Application Publication No. H6-154582 discloses a technique related to an apparatus that retrieves a product baked in a baking furnace. The apparatus disclosed there is configured to retrieve product powder from a saggar (baking container), the product powder being obtained by performing heating processing on raw material powder with which the saggar is filled. More particularly, the raw material powder with which the saggar is filled is sent to the baking furnace, baking processing is performed on the raw material powder in the baking furnace, then the saggar is held by a pair of saggar clamps of the product retrieving unit, and then the product powder in the saggar are retrieved into a product retrieval can.

In addition, Japanese Patent Application Publication No. 2006-206338 discloses a refractory material (baking base plate) used for baking a baked object. In the technique therein disclosed, the baking base plate formed in a plate shape includes a disposing surface on which the baked object is disposed, and the baked object is baked in a state where the baked object is disposed on the disposing surface. The baking base plate is configured to be repeatedly used.

In the technique described in Japanese Patent Application Publication No. H6-154582, the baking furnace and the product retrieving unit are arranged away from each other, and thus the saggar, accommodating the raw material powder and the product powder after baking, is configured to be put on a cart so as to move between the baking furnace and the product retrieving unit. Thus, before the saggar heated in the baking furnace moves to the product retrieving unit, the saggar may sufficiently cool. However, in order to shorten the period from the time of baking the powder till the time of taking out the products, it is desired to more immediately take out the products from the saggar carried out from the baking furnace. But if the saggar is sent in a too high temperature state to the product retrieving unit, and thus the portion holding the saggar is exposed to a high temperature, there are some fears of malfunctions.

Moreover, the technique described in Japanese Patent Application Publication No. 2006-206338 performs cooling when the baked object is taken out from the baking base plate.

Therefore, in a case where the baking base plate is used again so as to perform baking on the baked object, reheating the baking base plate is required and, thus, there is a problem of increasing the consumed energy.

SUMMARY OF THE INVENTION

The present disclosure provides a baked object taking-out apparatus that can easily take out a baked object from a baking base plate or baking container heated to a high temperature.

A baked object taking-out apparatus of one aspect herein disclosed is a baked object taking-out apparatus that takes out a baked object from a baking base plate having a disposing surface on which the baked object is disposed. The baked object taking-out apparatus includes a robot arm, a holding member that is provided on the robot arm, that is formed of a metal material, and that is capable of holding the baking base plate, and a protective member that is formed at a portion of the holding member which comes into contact with the baking base plate and that is configured with a ceramic coating which contains a ceramic component.

In accordance with the baked object taking-out apparatus, the protective member configured with the ceramic coating is provided at a portion, of the holding member that holds the baking base plate, which comes into contact with the baking base plate. Herein, since the ceramic coating is superior to the heat resistance, it is possible to hold the baking base plate heated to the high temperature. In addition, since the heat is hardly transferred from the protective member to the holding member, it is possible to suppress malfunctions caused by exposing the holding member at the high temperature. Furthermore, since being made of metal, the holding member holding the baking base plate has a high rigidity, and can surely hold the baking base plate. As described above, it is possible to surely hold the baking base plate heated to the high temperature, and thus it is possible to easily take out the baked object from the baking base plate heated to the high temperature. As this result, the baking base plate can keep the high temperature state, and thus, in the case where the baking base plate is reused to bake baked objects, it is possible to significantly decrease the energy required for heating the baking base plate.

In the baked object taking-out apparatus of one preferable aspect, the ceramic coating is a ceramic thermal-sprayed coating. The ceramic thermal-sprayed coating formed by the thermal spraying is more superior to the heat resistance and corrosion resistance, and thus it is possible to effectively protect the holding member.

In the baked object taking-out apparatus of one preferable aspect, the robot arm is configured to at least tilt the baking base plate by rotating the holding member about a predetermined axis. The baked object taking-out apparatus includes a retrieving apparatus that is provided below a position where the baking base plate is tilted and that retrieves the baked object disposed on the baking base plate. Thus, it is possible to easily take out the baked object from the baking base plate.

In the baked object taking-out apparatus of one preferable aspect, the holding member includes a first holding member and a second holding member that is provided at a position opposed to the first holding member in a first direction. The first holding member includes a first held surface that comes into contact with the baking base plate, a first upper claw part that is located at an upward position more than the first held surface and that protrudes toward the second holding member more than the first held surface, and a first lower claw part that is located at a downward position more than the first held surface and that protrudes toward the second holding member more than the first held surface. The second holding member includes a second held surface that comes into contact with the baking base plate, a second upper claw part that is located at an upward position more than the second held surface and that protrudes toward the first holding member more than the second held surface, and a second lower claw part that is located at a downward position more than the second held surface and that protrudes toward the first holding member more than the second held surface. As described above, since the holding member includes the first upper claw part, the first lower claw part, the second upper claw part, and the second lower claw part, it is possible to inhibit the baking base plate from being fallen from the holding member when the baking base plate is moved or rotated. Thus, the baking base plate can be moved or rotated at a higher speed, and therefore it is possible to take out the baked object from the baking base plate in a shorter time.

In the baked object taking-out apparatus of one preferable aspect, the first holding member includes a first middle claw part that is located at least between the first upper claw part and the first lower claw part with respect to an up and down direction, that protrudes from the first held surface to the second holding member, and that is, with respect to a second direction crossing to the first direction in a plane view, located at one side in the second direction more than an end part at one side in the second direction of the baking base plate, when the baking base plate comes into contact with the first held surface. The second holding member includes a second middle claw part that is located at least between the second upper claw part and the second lower claw part in the up and down direction, that protrudes from the second held surface to the first holding member, and that is, with respect to the second direction in a plane view, located at one side in the second direction more than an end part at one side in the second direction of the baking base plate when the baking base plate comes into contact with the second held surface. As described above, the holding member further includes the first middle claw part and the second middle claw part, and thus it is possible to surely inhibit the baking base plate from being fallen from the holding member when the baking base plate is moved or rotated. Thus, the baking base plate can be moved or rotated at a higher speed, and therefore it is possible to take out the baked object from the baking base plate in a shorter time.

In the baked object taking-out apparatus of one preferable aspect, a length of the first middle claw part in the first direction is longer than lengths of the first upper claw part and the first lower claw part in the first direction. A length of the second middle claw part in the first direction is longer than lengths of the second upper claw part and the second lower claw part in the first direction. In accordance with such a configuration, it is possible to more surely inhibit the baking base plate held by the holding member from being fallen from the one side in the second direction.

In the baked object taking-out apparatus of one preferable aspect, the robot arm includes an arm part on which the holding member is provided. The protective member is formed at least on an upper surface of the arm part. In accordance with such a configuration, even when one part of the baked object disposed on the baking base plate is fallen to the upper surface of the arm part, the arm part is protected by the protective member configured with the ceramic coating, and thus it is possible to suppress malfunctions caused on the arm part.

A baking system of one aspect herein disclosed includes: a baking furnace that carries the baking base plate and that bakes the baked object disposed on the disposing surface of the baking base plate; a carrying line that is provided at a downstream side of the baking furnace and that carries the baking base plate carried from the baking furnace; the baked object taking-out apparatus; and a retrieving line that is provided at a downstream side more than the baked object taking-out apparatus and that retrieves the baking base plate. The baked object taking-out apparatus is provided at a downstream side of the carrying line. In accordance with such a configuration, it is possible to efficiently implement baking the baked object, taking out the baked object, and retrieving the baking base plate.

In the baking system of one preferable aspect, the carrying line includes a first carrying mechanism that carries the baking base plate and a first lifter that moves the baking base plate to an upward position more than the first carrying mechanism. Thus, the baked object taking-out apparatus can easily lift up the baking base plate from the carrying line.

In the baking system of one preferable aspect, the retrieving line includes a second carrying mechanism that carries the baking base plate and a second lifter on which the baking base plate is disposed at an upward position more than the second carrying mechanism. The second lifter is configured to arrange the baking base plate on the second carrying mechanism by moving downward. Thus, the baked object taking-out apparatus can easily dispose the baking base plate on the retrieving line.

A baked object taking-out apparatus of one aspect herein disclosed is a taking-out apparatus that takes out a baked object from a baking container whose upper surface is opened. The baked object taking-out apparatus includes: a robot arm; a holding member that is provided on the robot arm, that is formed of a metal material, and that is capable of holding the baking container; and a protective member that is formed at a portion of the holding member which comes into contact with the baking container and that is configured with a ceramic coating which contains a ceramic component.

In accordance with such a baked object taking-out apparatus, the protective member configured with the ceramic coating is provided at a portion which comes into contact with the baking container, of the holding member that holds the baking container. Herein, since the ceramic coating is superior to the heat resistance, it is possible to hold the baking container heated to the high temperature. In addition, since the heat is hardly transferred from the protective member to the holding member, it is possible to suppress malfunctions caused by exposing the holding member at the high temperature. Furthermore, since being made of metal, the holding member holding the baking container has a high rigidity, and can surely hold the baking container. As described above, it is possible to surely hold the baking container heated to the high temperature, and thus is possible to easily take out the baked object from the baking container heated to the high temperature.

In the baked object taking-out apparatus of one preferable aspect, the ceramic coating is a ceramic thermal-sprayed coating. The ceramic thermal-sprayed coating formed by the thermal spraying is more superior to the heat resistance and the corrosion resistance, and thus it is possible to effectively protect the holding member.

In the baked object taking-out apparatus of one preferable aspect, the robot arm is configured to be capable of vertically reversing the baking container by rotating the holding member. The baked object taking-out apparatus includes a retrieving apparatus that is provided below a position where the baking container is reversed, and that retrieves the baked object accommodated in the baking container. Thus, it is possible to easily take out the baked object from the baking container.

In the baked object taking-out apparatus of one preferable aspect, the holding member includes a first holding member and a second holding member that is provided at a position opposed to the first holding member. The first holding member includes a first held surface that comes into contact with the baking container, a first upper claw part that is located at an upward position more than the first held surface and that protrudes toward the second holding member more than the first held surface, and a first lower claw part that is located at a downward position more than the first held surface and that protrudes toward the second holding member more than the first held surface. The second holding member includes a second held surface that comes into contact with the baking container, a second upper claw part that is located at an upward position more than the second held surface and that protrudes toward the first holding member more than the second held surface, and a second lower claw part that is located at a downward position more than the second held surface and that protrudes toward the first holding member more than the second held surface. As described above, since the holding member includes the first upper claw part, the first lower claw part, the second upper claw part, and the second lower claw part, it is possible to inhibit the baking container from being fallen from the holding member when the baking container is moved or rotated. Thus, the baking container can be moved or rotated at a higher speed, and therefore it is possible to take out the baked object from the baking container in a shorter time.

In the baked object taking-out apparatus of one preferable aspect, the baking container includes a bottom surface part having a rectangular shape and four side surface parts extending upward from the bottom surface part. On each of the side surface parts, a recessed part which is recessed downward is formed. In a case where, on the baking container, another one of the baking container are stacked in an up and down direction, the first lower claw part of the first holding member and the second lower claw part of the second holding member that hold the another one stacked above the baking container are located at the recessed parts of the baking container located at a lower side. In accordance with such a configuration, although the first lower claw part and the second lower claw part are provided for inhibiting the baking container from being fallen, it is possible to stack up baking containers in multiple stages without making the first lower claw part and the second lower claw part interfere with the previously disposed baking container.

In the baked object taking-out apparatus of one preferable aspect, when a direction in which the first holding member and the second holding member are aligned is treated as a first direction, a length of the first lower claw part in the first direction is shorter than a length of the first upper claw part in the first direction, and a length of the second lower claw part in the first direction is shorter than a length of the second upper claw part in the first direction. There are some fears of the deviation on the disposed position of the baking container by the first lower claw part and second lower claw part coming into contact with the bottom surface part of the baking container when the baking container is disposed, but making the first lower claw part and the second lower claw part be relatively shorter can reduce the contact area with the baking container and can suppress the deviation on the disposed position of the baking container.

A baking system of one aspect herein disclosed includes: a baking furnace that carries the baking container and that bakes the baked object accommodated in the baking container; a carrying line that is provided at a downstream side of the baking furnace and that carries the baking container carried from the baking furnace; the baked object taking-out apparatus; and a retrieving line that is provided at a downstream side more than the baked object taking-out apparatus and that retrieves the baking container. The baked object taking-out apparatus is provided at a downstream side of the carrying line. In accordance with such a configuration, it is possible to efficiently implement baking the baked object, taking out the baked object, and retrieving the baking container.

In the baking system of one preferable aspect, the carrying line includes a first carrying mechanism that carries the baking container, and a first lifter that moves the baking container to an upward position more than the first carrying mechanism. Thus, the baked object taking-out apparatus can easily lift up the baking container from the carrying line.

In the baking system of one preferable aspect, the retrieving line includes a second carrying mechanism that carries the baking container, and a second lifter on which the baking container is disposed at an upper portion more than the second carrying mechanism. The second lifter is configured to arrange the baking container on the second carrying mechanism by moving downward. Thus, the baked object taking-out apparatus can easily dispose the baking container on the retrieving line.

BRIEF DESCRIPTION OF THE DRAWINGS

FIG. 24 is a side view showing a state in which the baking container is reversed at the upward position of the retrieving apparatus in accordance with one embodiment.

DESCRIPTION OF THE PREFERRED EMBODIMENTS

Below, one of typical embodiments in the present disclosure will be described in details by reference to the accompanying drawings. Incidentally, in the following accompanying drawings, the members/parts providing the same effect are given the same numerals and signs. Further, the dimensional relation (such as length, width, or thickness) in each drawing does not reflect the actual dimensional relation. The directions of up, down, left, right, front, and rear are respectively represented by arrows of U, D, L, R, F, and Rr in drawings. Herein, the directions of up, down, left, right, front, and rear are defined only for convenience sake of explanation, and do not restrict the disclosure of the present application unless specifically mentioned.

Figure 1:
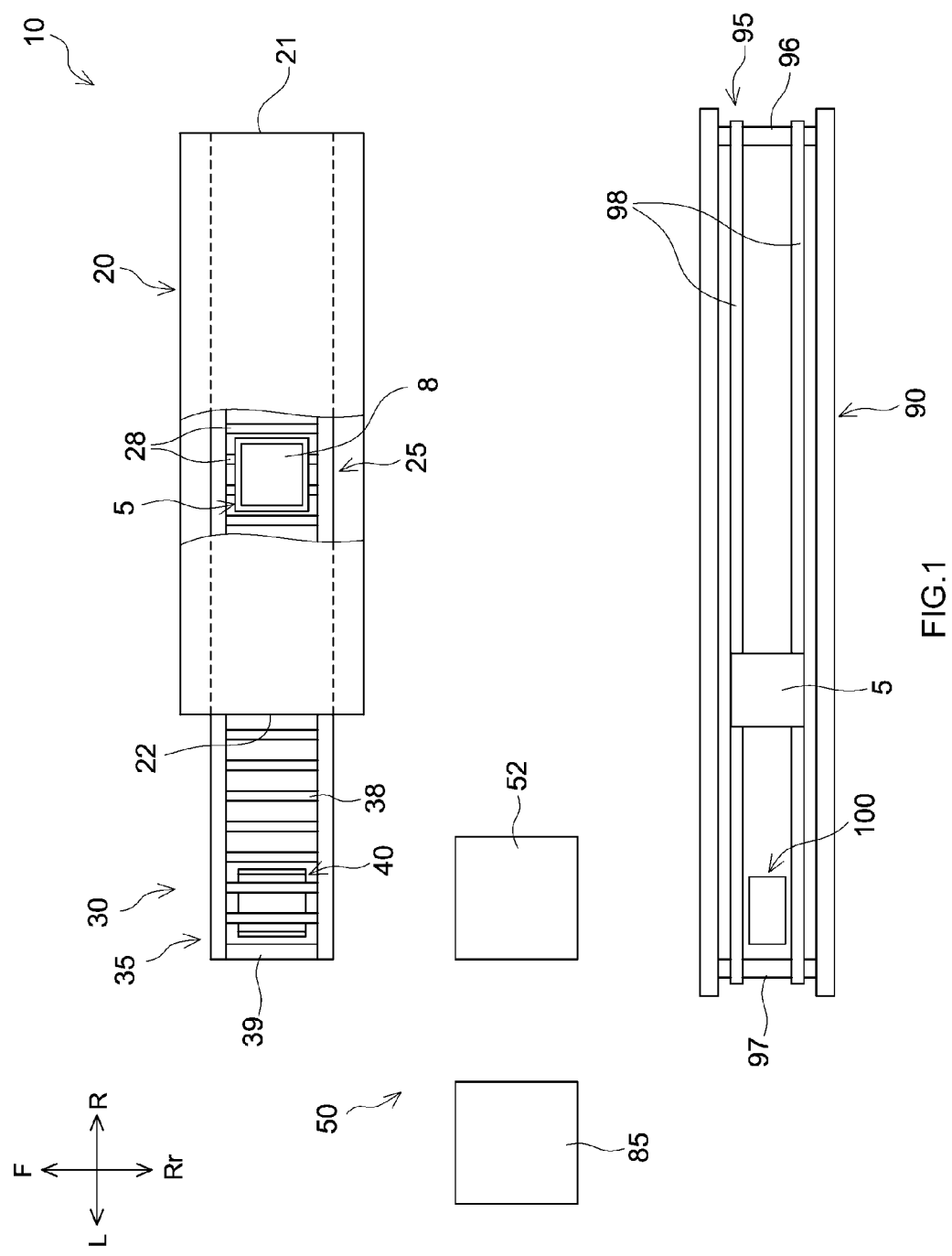
FIG. 1 is a plane view schematically showing a baking system in accordance with one embodiment.

FIG. 1 is a plane view schematically showing a baking system 10. The baking system 10 includes a baking furnace 20, a carrying line 30, a baked object taking-out apparatus 50, and a retrieving line 90. The baking system 10 uses a baking base plate 5 on which a baked object 8 is disposed (see FIG. 2, too). The baking base plate 5 is configured to be capable of moving between the baking furnace 20, the carrying line 30, the baked object taking-out apparatus 50, and the retrieving line 90, repeatedly in this order. In other words, the baking base plate 5 is repeatedly used in the baking system 10. In the present embodiment, with respect to a direction in which the baking base plate 5 is carried (flow direction), the baking furnace 20 is arranged at the most upstream side and the retrieving line 90 is arranged at the most downstream side.

Figure 2:
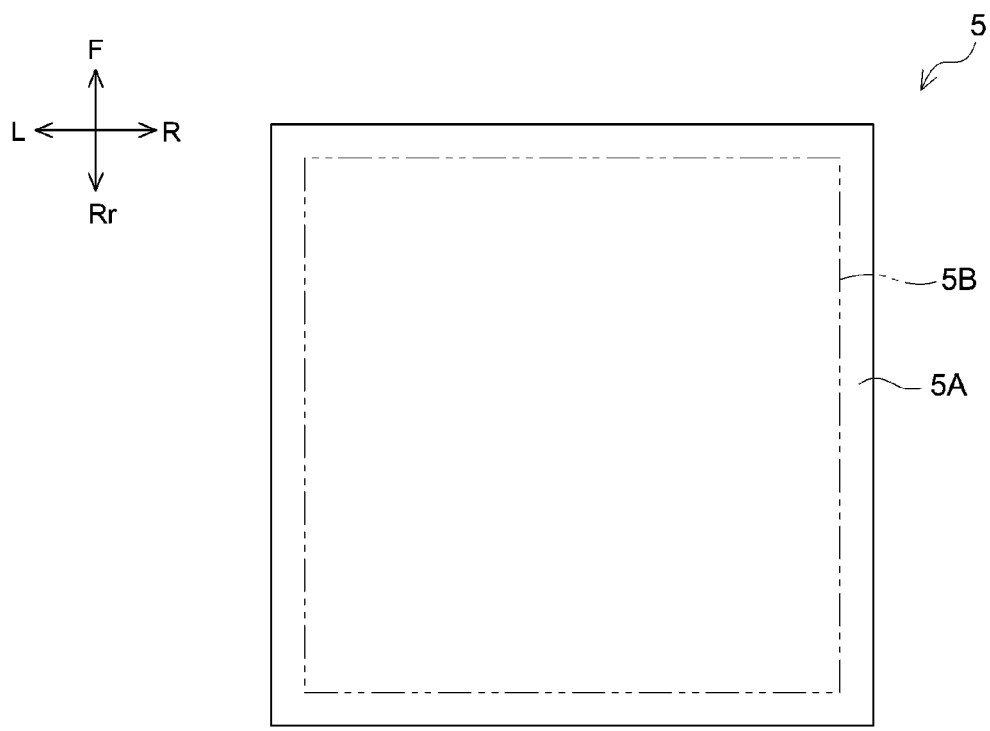
FIG. 2 is a plane view schematically showing a baking base plate in accordance with one embodiment.
Figure 3:
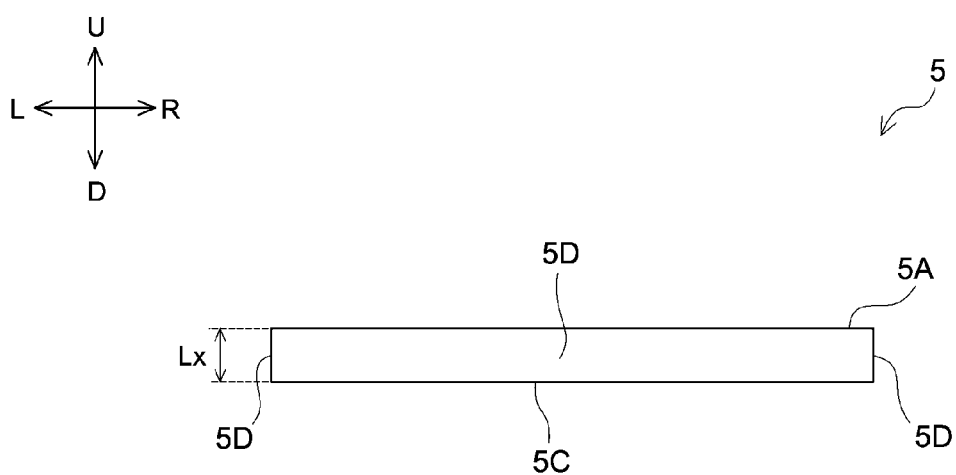
FIG. 3 is a side view schematically showing the baking base plate in accordance with one embodiment.

FIG. 2 is a plane view of the baking base plate 5. FIG. 3 is a side view of the baking base plate 5. As shown in FIG. 2 and FIG. 3, the baking base plate 5 is formed in a flat plate shape. The baking base plate 5 is, in a plane view, formed in a rectangular shape (hereinafter, square shape). The baking base plate 5 includes a disposing surface 5A on which the baked object 8 (see FIG. 4) is disposed. The baked object 8 is disposed on a disposed area 5B of the disposing surface 5A, and the disposed area 5B is surrounded by two-dot chain lines in FIG. 2. The baking base plate 5 is formed with a material superior to the heat resistance (fire resistance). As for the material configuring the baking base plate 5, a ceramic material can be obtained, for example, mullite ($3Al_2O_3/2SiO_2$), cordierite ($2MgO/2Al_2O_3/5SiO_2$), mullite/cordierite, aluminum oxide (alumina: $Al_2O_3$), or the like. The thermal expansion coefficient of the baking base plate 5 is, for example, $2\times10^{-3}/K$ to $4\times10^{-3}/K$ (for example, in a case where the baking base plate 5 is formed with mullite or cordierite, $3\times10^{-3}/K$).

As shown in FIG. 1, the baking furnace 20 bakes the baked object 8 (see FIG. 4, too) disposed on the baking base plate 5 (see FIG. 2). The baking furnace 20 is formed in a tunnel type, and the baking base plate 5 is carried in the baking furnace 20. The baking furnace 20 internally includes a carrying passage 25 on which the baking base plate 5 is carried. In the carrying passage 25, for example, a plurality of ceramic rollers 28 are provided at predetermined intervals. The baking base plate 5 is carried on the ceramic rollers 28. The baking furnace 20 in the present embodiment is a continuous baking furnace that carries a plurality of baking base plates 5 on the carrying passage 25 so as to continuously bake the baked objects 8 disposed on the baking base plates 5. As for the continuous baking furnace, various structures can be applied. As for the continuous baking furnace, for example, a roller hearth kiln (RHK) and a so-called pusher furnace can be obtained. The roller hearth kiln is a continuous baking furnace in which the baking base plate 5 is carried with ceramic rollers. On the other hand, the pusher furnace is provided with no carrying roller for carrying the baking base plate 5 as being different from the roller hearth kiln, and then the baking base plate 5 is carried while sliding on the ceramic rail by being sequentially pushed. It is preferable that the inner wall of the baking furnace 20 is, for example, formed by overlaying ceramic fiber boards each formed in a predetermined shape. The ceramic fiber board is a plate member which is made by, for example, adding inorganic fillers and inorganic/organic binding materials to so-called bulk fibers and then forming in a plate shape. The baking furnace 20 includes a carry-in port 21 for carrying the baking base plate 5 in and a carry-out port 22 for carrying the baking base plate 5 out, and the carry-out port 22 is formed at a downstream side more than the carry-in port 21. The carrying passage 25 is connected to the carrying line 30 via the carry-out port 22.

Figure 4:
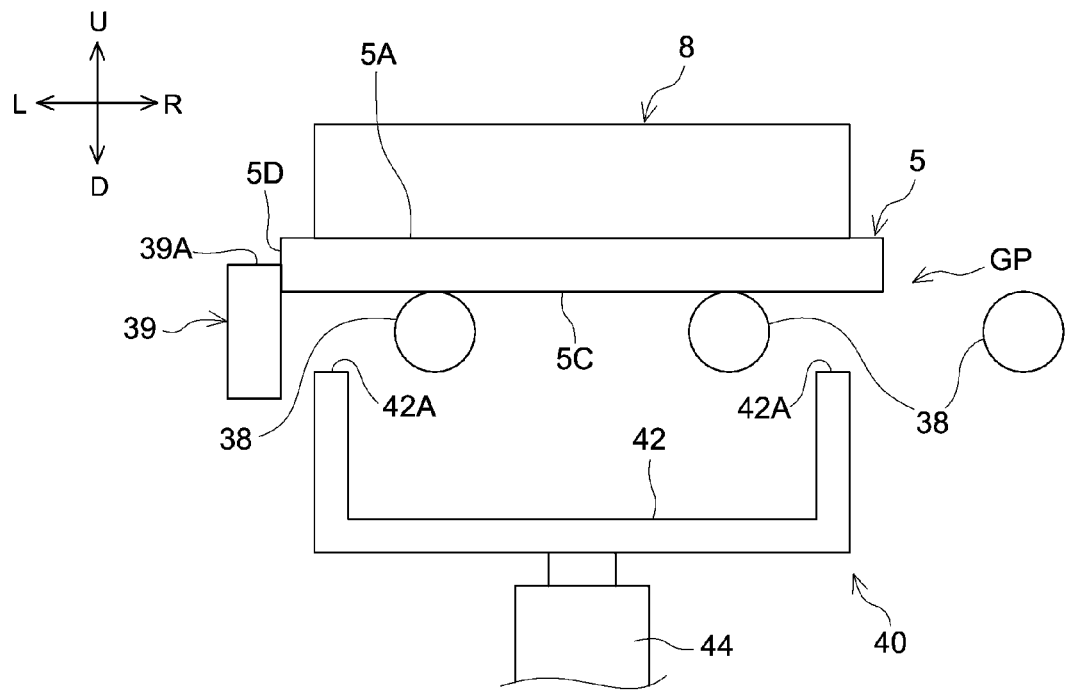
FIG. 4 is a side view schematically showing a first lifter in accordance with one embodiment.
Figure 5:
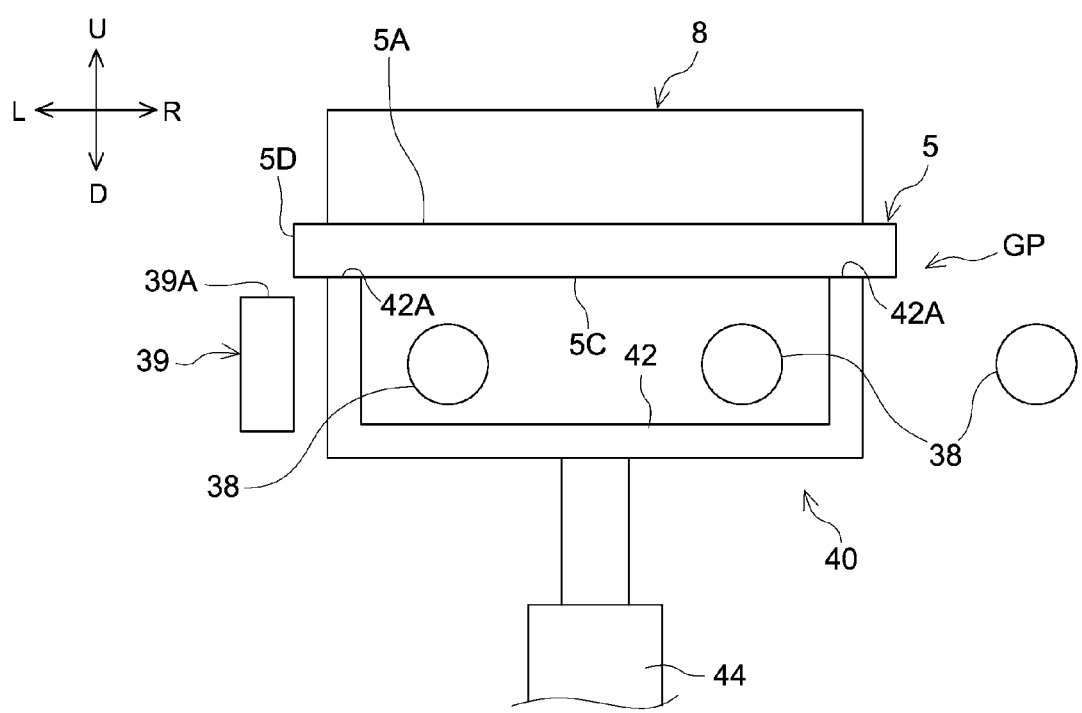
FIG. 5 is a side view schematically showing the first lifter in accordance with one embodiment, and is a side view showing a state in which the baking base plate is lifted upward from the state shown in FIG. 4.

As shown in FIG. 1, the carrying line 30 is provided at a downstream side of the baking furnace 20. The length of the carrying line 30 in the longitudinal direction (hereinafter, left and right direction) is shorter than the length of the baking furnace 20 in the longitudinal direction (hereinafter, left and right direction). The carrying line 30 includes a first carrying mechanism 35 that carries the baking base plate 5 carried out from the baking furnace 20, a stopper 39 that stops the movement of the baking base plate 5 at a predetermined position of the first carrying mechanism 35, and a first lifter 40 that moves the baking base plate 5 to an upward position more than the first carrying mechanism 35. The first carrying mechanism 35 includes a plurality of carrying rollers 38 arranged at predetermined intervals. The baking base plate 5 is carried on the carrying rollers 38. As shown in FIG. 4, the stopper 39 is arranged at a downstream side more than the first lifter 40. The top end 39A of the stopper 39 is located at an upward position more than the carrying rollers 38. The stopper 39 is configured to stop the baking base plate 5, carried on the carrying rollers 38, at a holding position GP. The stopper 39 is configured to be capable of coming into contact with a side surface 5D of the baking base plate 5. The first lifter 40 includes a first table 42 whose cross section is formed in a U shape, and a first elevating mechanism 44 that moves the first table 42 in an up and down direction. The top end 42A of the first table 42 is configured to be capable of coming into contact with the bottom surface 5C of the baking base plate 5. The first table 42 is connected to an upper portion of the first elevating mechanism 44. The first elevating mechanism 44 is, for example, an air cylinder. It is configured that, before the baking base plate 5 reaches the holding position GP, the first elevating mechanism 44 makes the first table 42 move downward so as to locate the top end 42A of the first table 42 at a lower position more than the carrying rollers 38. On the other hand, as shown in FIG. 5, it is configured that, when the baking base plate 5 locating at the holding position GP is moved upward, the first elevating mechanism 44 makes the first table 42 move upward so as to locate the top end 42A of the first table 42 at an upward position more than the carrying rollers 38 and the stopper 39. Thus, the bottom surface 5C of the baking base plate 5 is located at the upper position more than the carrying rollers 38 and the stopper 39, and therefore the baking base plate 5 is easily held by a holding member 70 described later of the baked object taking-out apparatus 50.

As shown in FIG. 1, the baked object taking-out apparatus 50 is provided at a downstream side of the carrying line 30. The baked object taking-out apparatus 50 is an apparatus that takes out the baked object 8 (see FIG. 4) disposed on the disposing surface 5A of the baking base plate 5. The baked object taking-out apparatus 50 is an apparatus that carries the baking base plate 5 from the carrying line 30 to the retrieving line 90. The baked object taking-out apparatus 50 includes a robot arm 52, a holding member 70 (see FIG. 7), a protective member 80 (see FIG. 7), and a retrieving apparatus 85.

Figure 6:
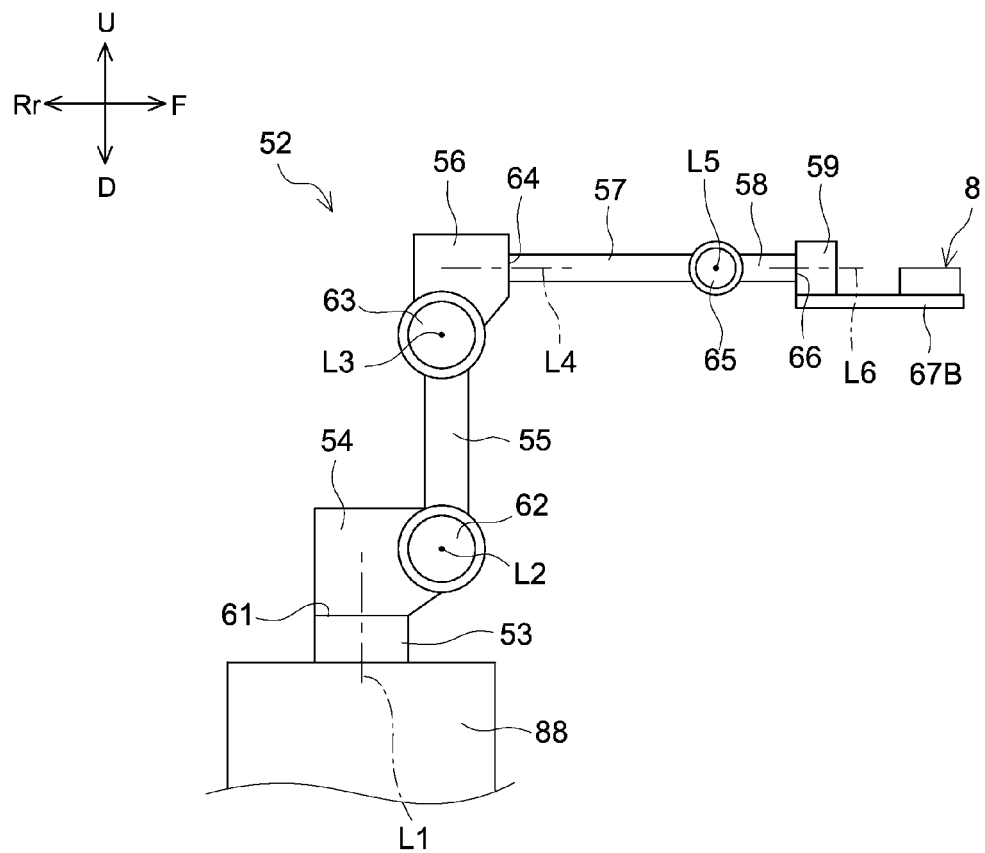
FIG. 6 is a side view schematically showing one part of a taking-out apparatus in accordance with one embodiment.

As shown in FIG. 6, the robot arm 52 is a 6-axis vertical articulated robot. The robot arm 52 is arranged on a robot pedestal 88. The robot arm 52 includes a base member 53, a first link 54, a second link 55, a third link 56, a fourth link 57, a fifth link 58, a sixth link 59, a first joint 61, a second joint 62, a third joint 63, a fourth joint 64, a fifth joint 65, and a sixth joint 66.

As shown in FIG. 6, the first link 54 is connected to the base member 53 via the first joint 61. The first link 54 is configured to be capable of rotating with respect to the base member 53 about the first axis L1 extending in the vertical direction. The second link 55 is connected to the first link 54 via the second joint 62. The second link 55 is configured to be capable of rotating with respect to the first link 54 about the second axis L2 extending in the horizontal direction. The third link 56 is connected to the second link 55 via the third joint 63. The third link 56 is configured to be capable of rotating with respect to the second link 55 about the third axis L3 extending in the horizontal direction.

As shown in FIG. 6, the fourth link 57 is connected to the third link 56 via the fourth joint 64. The fourth link 57 is configured to be capable of rotating with respect to the third link 56 about the fourth axis L4 extending in the horizontal direction (direction in which the fourth link 57 extends). The fifth link 58 is connected to the fourth link 57 via the fifth joint 65. The fifth link 58 is configured to be capable of rotating with respect to the fourth link 57 about the fifth axis L5 extending in the horizontal direction. The sixth link 59 is connected to the fifth link 58 via the sixth joint 66. The sixth link 59 is configured to be capable of rotating with respect to the fifth link 58 about the sixth axis L6 extending in the horizontal direction.

Figure 7:
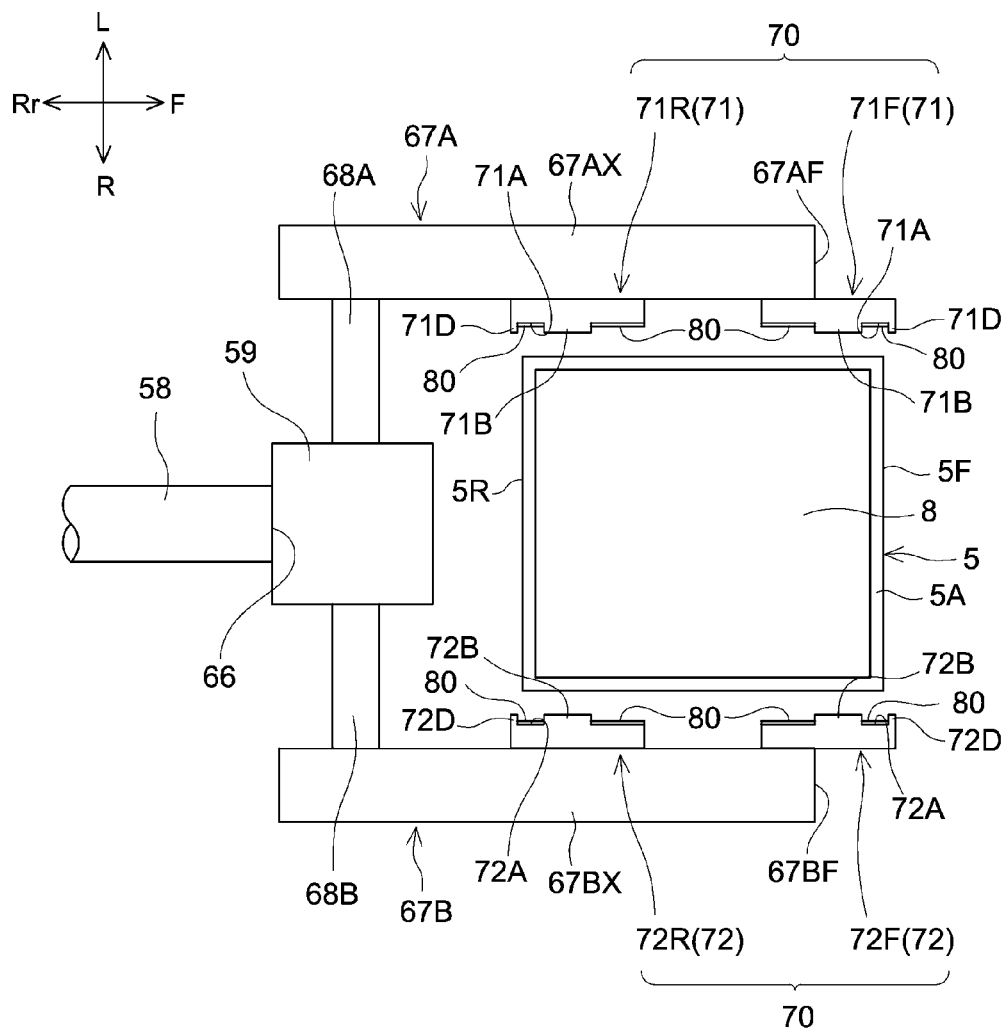
FIG. 7 is a plane view schematically showing one part of the taking-out apparatus in accordance with one embodiment, and is a plane view showing a state before the baking base plate is held.

As shown in FIG. 7, the sixth link 59 is provided with a first arm part 67A and a second arm part 67B that is arranged at a position opposed to the first arm part 67A. The first arm part 67A is connected to the sixth link 59 with the first axis 68A. The second arm part 67B is connected to the sixth link 59 with the second axis 68B. The first arm part 67A and the second arm part 67B extend in the front and rear direction. The first axis 68A and the second axis 68B extend in the left and right direction. The first arm part 67A and the second arm part 67B are configured to be capable of coming closer to and getting away from each other with the first axis 68A and the second axis 68B. In other words, it is configured that, when the first axis 68A and the second axis 68B go backward, the first arm part 67A and the second arm part 67B come closer to each other, and that, when the first axis 68A and the second axis 68B go forward, the first arm part 67A and the second arm part 67B get away from each other.

The holding member 70 is configured to be capable of holding the baking base plate 5. The holding member 70 is provided on the robot arm 52. More particularly, as shown in FIG. 7, the holding members 70 are provided on the first arm part 67A and second arm part 67B of the sixth link 59. The holding member 70 is formed of a metal material. The holding member 70 is formed of, for example, stainless steel. The thermal expansion coefficient of the holding member 70 is, for example, $15 \times 10^{-6}$/K to $20 \times 10^{-6}$/K (for example, $17.3 \times 10^{-6}$/K in the case where the holding member 70 is formed of SUS304). The holding member 70 includes a first holding member 71 and a second holding member 72 that is provided at a position opposed to the first holding member 71 in the left and right direction. The left and right direction is an example of the first direction. The first holding member 71 and the second holding member 72 are aligned in the left and right direction. The first holding member 71 is provided on the first arm part 67A. The first holding member 71 includes a front side first holding member 71F, and a rear side first holding member 71R that is located at a rearward position more than the front side first holding member 71F. Below, the front side first holding member 71F and the rear side first holding member 71R might be collectively called the first holding member 71. Here, two first holding members 71 are provided on the first arm part 67A. The second holding member 72 is provided on the second arm part 67B. The second holding member 72 includes a front side second holding member 72F and a rear side second holding member 72R that is located at a rearward position more than the front side second holding member 72F. Below, the front side second holding member 72F and the rear side second holding member 72R might be collectively called as the second holding member 72. For the front side first holding member 71F, the rear side first holding member 71R, the front side second holding member 72F, and the rear side second holding member 72R, the attached positions and directions are different but other configurations are the same.

Figure 8:
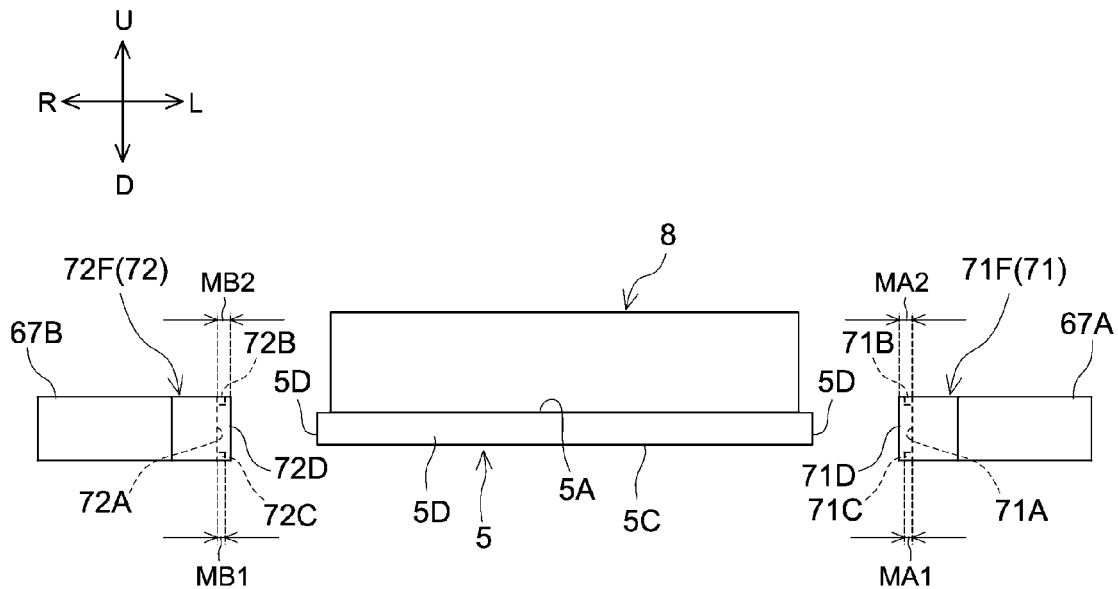
FIG. 8 is a front view schematically showing one part of the taking-out apparatus in accordance with one embodiment, and is a front view showing a state before the baking base plate is held.
Figure 9:
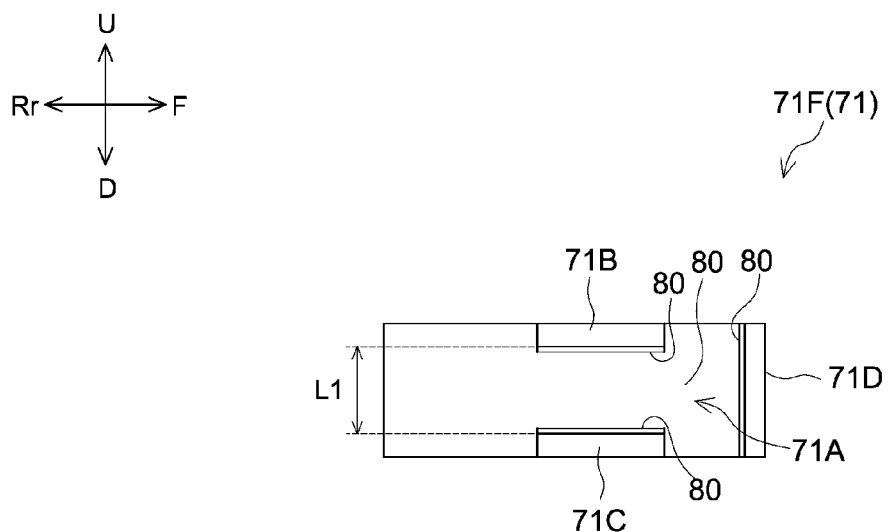
FIG. 9 is a side view schematically showing a holding member in accordance with one embodiment.

As shown in FIG. 8, the first holding member 71 includes a first held surface 71A that comes into contact with the baking base plate 5, a first upper claw part 71B that is located at an upward position more than the first held surface 71A and protrudes toward the second holding member 72 (hereinafter, rightward) more than the first held surface 71A, a first lower claw part 71C that is located at a lower position more than the first held surface 71A and protrudes toward the second holding member 72 more than the first held surface 71A, and a first middle claw part 71D. The first held surface 71A indirectly comes into contact with the baking base plate 5 (particularly, the side surface 5D of the baking base plate 5) via the protective member 80. The length MA1 of the first upper claw part 71B in the left and right direction and the length MA1 of the first lower claw part 71C in the left and right direction are the same to each other. The first upper claw part 71B is formed to have a length that makes the first upper claw part 71B not come into contact with the baked object 8 disposed on the disposing surface 5A of the baking base plate 5. The first upper claw part 71B is not overlapped in a plane view with the disposed area 5B of the baking base plate 5. The distance L1 (see FIG. 9) in the up and down direction between the first upper claw part 71B and the first lower claw part 71C is longer than the length LX (see FIG. 3) of the baking base plate 5 in the up and down direction. As shown in FIG. 9, the first middle claw part 71D is at least located between the first upper claw part 71B and the first lower claw part 71C in the up and down direction. Here, the first middle claw part 71D extends from the top end of the first upper claw part 71B to the bottom end of the first lower claw part 71C. As shown in FIG. 7, the first middle claw part 71D protrudes from the first held surface 71A toward the second holding member 72. The first middle claw part 71D of the front side first holding member 71F is located at a frontward position more than the first upper claw part 71B and the first lower claw part 71C. The first middle claw part 71D of the front side first holding member 71F is located at a frontward position more than the front end 5F of the baking base plate 5 in a plane view when the baking base plate 5 comes into contact with the first held surface 71A (see FIG. 10). The first middle claw part 71D of the front side first holding member 71F is located at a frontward position more than the front end 67AF of the first arm part 67A. The first middle claw part 71D of the rear side first holding member 71R is located at a rearward position more than the first upper claw part 71B and the first lower claw part 71C. The first middle claw part 71D of the rear side first holding member 71R is located at a rearward position more than the rear end 5R of the baking base plate 5 in a plane view, when the baking base plate 5 comes into contact with the first held surface 71A (see FIG. 10). As shown in FIG. 8, the length MA2 of the first middle claw part 71D in the left and right direction is longer than the length MA1 of the first upper claw part 71B and the first lower claw part 71C in the left and right direction.

As shown in FIG. 8, the second holding member 72 includes a second held surface 72A that comes into contact with the baking base plate 5, a second upper claw part 72B that is located at an upward position more than the second held surface 72A and that protrudes toward the first holding member 71 (hereinafter, toward the left) more than the second held surface 72A, a second lower claw part 72C that is located at a downward position more than the second held surface 72A and that protrudes from the second held surface 72A toward the first holding member 71, and a second middle claw part 72D. The second held surface 72A indirectly comes into contact with the baking base plate 5 (particularly, the side surface 5D of the baking base plate 5) via the protective member 80. The length MB1 of the second upper claw part 72B in the left and right direction and the length MB1 of the second lower claw part 72C in the left and right direction are the same to each other. The second upper claw part 72B is formed to have a length that makes the second upper claw part 72B not come into contact with the baked object 8 disposed on the disposing surface 5A of the baking base plate 5. The second upper claw part 72B is not overlapped in a plane view with the disposed area 5B of the baking base plate 5. The distance in the up and down direction between the second upper claw part 72B and the second lower claw part 72C is the same as the distance L1 (see FIG. 9) in the up and down direction between the first upper claw part 71B and the first lower claw part 71C, and is longer than the length LX (see FIG. 3) of the baking base plate 5 in the up and down direction. The second middle claw part 72D is located at least between the second upper claw part 72B and the second lower claw part 72C in the up and down direction. Here, the second middle claw part 72D extends from the top end of the second upper claw part 72B to the bottom end of the second lower claw part 72C. As shown in FIG. 7, the second middle claw part 72D protrudes from the second held surface 72A toward the first holding member 71. The second middle claw part 72D of the front side second holding member 72F is located at a frontward position more than the second upper claw part 72B and the second lower claw part 72C (see FIG. 10). The second middle claw part 72D of the front side second holding member 72F is located at a frontward position more than the front end 5F of the baking base plate 5 in a plane view when the baking base plate 5 comes into contact with the second held surface 72A. The second middle claw part 72D of the front side second holding member 72F is located at a frontward position more than the front end 67BF of the second arm part 67B. The second middle claw part 72D of the rear side second holding member 72R is located at a rearward position more than the second upper claw part 72B and the second lower claw part 72C. The second middle claw part 72D of the rear side second holding member 72R is located at a rearward position more than the rear end 5R of the baking base plate 5 in a plane view, when the baking base plate 5 comes into contact with the second held surface 72A (see FIG. 10). As shown in FIG. 8, the length MB2 of the second middle claw part 72D in the left and right direction is longer than the lengths MB1 of the second upper claw part 72B and second lower claw part 72C in the left and right direction.

As shown in FIG. 7 and FIG. 9, the protective member 80 is formed at a portion of the holding member 70 which comes into contact with the baking base plate 5. The protective member 80 is formed at least on a portion that is opposed to the baking base plate 5 when the baking base plate 5 is held by the holding member 70. In the present embodiment, the protective members 80 are formed on the first held surface 71A, first upper claw part 71B, first lower claw part 71C, and first middle claw part 71D of the first holding member 71, and on the second held surface 72A, second upper claw part 72B, second lower claw part 72C, and second middle claw part 72D of the second holding member 72. The protective members 80 are formed, for example, on surfaces (hereinafter lower surface) of the first upper claw part 71B and the second upper claw part 72B opposed to the disposing surface 5A of the baking base plate 5, on surfaces (hereinafter upper surface) of the first lower claw part 71C and the second lower claw part 72C opposed to the bottom surface 5C of the baking base plate 5, and on surfaces of the first middle claw part 71D and the second middle claw part 72D opposed to the side surface 5D of the baking base plate 5. The protective member 80 might be formed on a surface (hereinafter, a surface extending in a front and rear direction and in an up and down direction) of the first upper claw part 71B and the second upper claw part 72B opposed to the baked object 8 disposed on the disposing surface 5A of the baking base plate 5. The first held surface 71A and the second held surface 72A indirectly comes into contact with the baking base plate 5 via the protective member 80. The first upper claw part 71B, the first lower claw part 71C, the first middle claw part 71D, the second upper claw part 72B, the second lower claw part 72C, and the second middle claw part 72D can indirectly come into contact with the baking base plate 5 via the protective member 80. Further, in the present embodiment, the protective members 80 are formed on the upper surface 67AX of the first arm part 67A and the upper surface 67BX of the second arm part 67B. Incidentally, the protective member 80 might be formed on the whole of the first arm part 67A and second arm part 67B. The protective member 80 is configured with a ceramic coating that contains a ceramic component. As for the ceramic component, for example, it is possible to use a ceramic material made from oxides of various metals (oxide type ceramic), or to use a ceramic material made of nonoxides of carbide, boride, nitride, apatite, or the like. The thermal expansion coefficient of the protective member 80 is, for example, $5 \times 10^{-6}$/K to $9.6 \times 10^{-6}$/K (for example, $5.3 \times 10^{-6}$/K when the protective member 80 is formed from gray alumina). Incidentally, except for FIG. 7 and FIG. 9, an illustration of the protective member 80 is omitted for convenience sake.

As for the oxide type ceramic, particular, it is possible to use alumina, for example, zirconia, yttria, chromia, titania, cobaltite, magnesia, silica, calcia, ceria, ferrite, spinel, zircon, nickel oxide, silver oxide, copper oxide, zinc oxide, gallium oxide, strontium oxide, scandium oxide, samarium oxide, bismuth oxide, lanthanum oxide, lutetium oxide, hafnium oxide, vanadium oxide, niobium oxide, tungsten oxide, manganese oxide, tantalum oxide, terbium oxide, europium oxide, neodymium oxide, tin oxide, antimony oxide, antimony-containing tin oxide, indium oxide, tin contain indium oxide, zirconium oxide aluminate, zirconium oxide silicate, hafnium oxide aluminate, hafnium oxide silicate, titanium oxide silicate, lanthanum oxide silicate, lanthanum oxide aluminate, yttrium oxide silicate, titanium oxide silicate, tantalum oxide silicate, and the like. For example, it is possible to suitably use gray alumina ($Al_2O_3$-$3TiO_2$) which is an alumina type material.

In addition, as for the nonoxide type ceramic, it is possible to use, for example, a carbide, such as tungsten carbide (WC), chromium carbide, vanadium carbide, niobium carbide, molybdenum carbide, tantalum carbide, titanium carbide, zirconium carbide, hafnium carbide, silicon carbide, and boron carbide, a boride, such as tungsten boride (WB), molybdenum boride, chromium boride, hafnium boride, zirconium boride, tantalum boride, and titanium boride, a nitride, such as boron nitride, titanium nitride, silicon nitride, and aluminum nitride, a composite compound, such as forsterite, steatite, cordierite, mullite, barium titanate, lead titanate, lead zirconate titanate, Mn—Zn ferrite, Ni—Zn ferrite, and sialon, a phosphoric acid chemical compound, such as hydroxyapatite, and calcium phosphate, or the like.

The ceramic coating is, for example, a ceramic thermal-sprayed coating formed by thermal spraying. Although the thermal spraying method is not particularly restricted, it is possible to suitably use, for example, a plasma thermal spraying method, such as atmospheric plasma thermal spraying (APS), low pressure plasma thermal spraying (LPS), and high pressure plasma thermal spraying, a high speed frame thermal spraying, such as high velocity oxygen flame (HVOF) thermal spraying method, warm spraying thermal spraying method, and high velocity air flame (HVAF) thermal spraying method, or the like. In addition, the forming method for the ceramic coating is not restricted to the thermal spraying, and it might be possible to use, for example, the chemical vapor deposition method (CVD), the physical vapor deposition method (PVD), the sputtering, the spin coating, the dipping, the spray coating, or the like.

Figure 10:
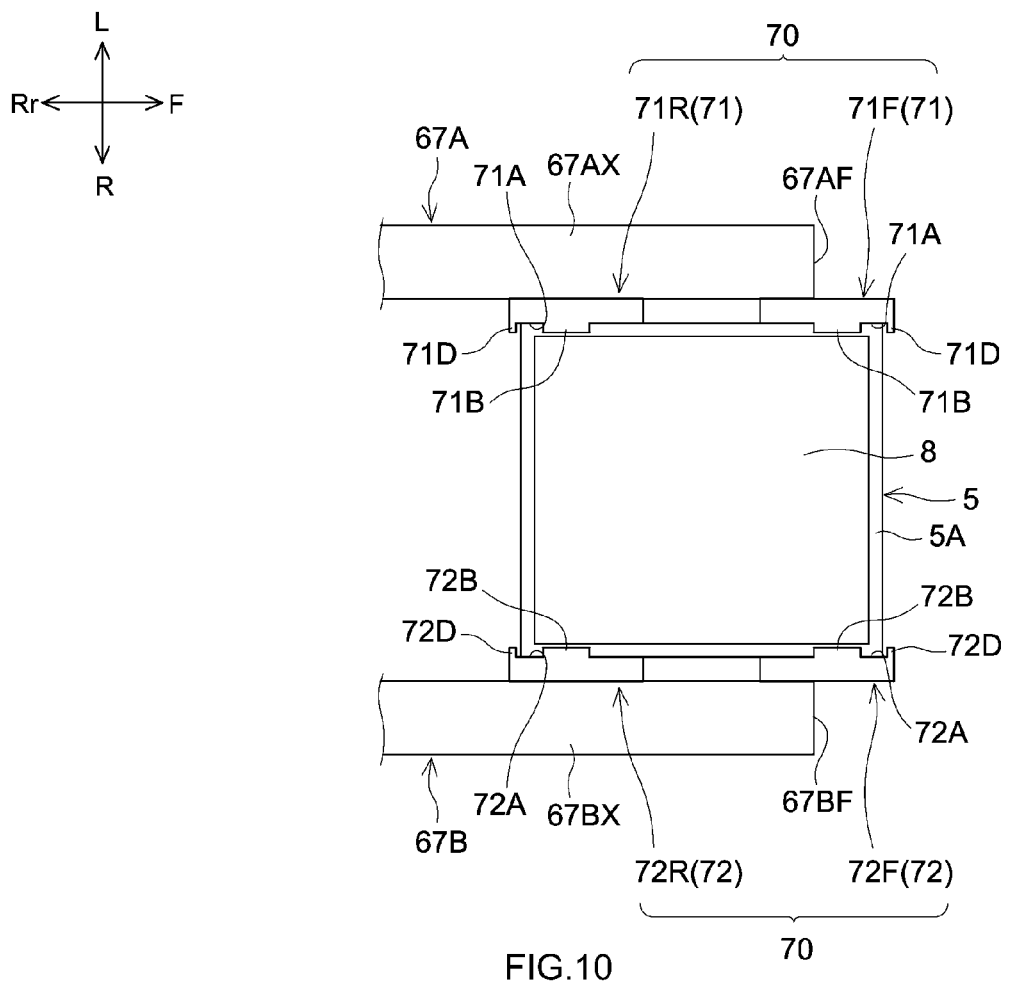
FIG. 10 is a plane view schematically showing one part of the taking-out apparatus in accordance with one embodiment, and is a plane view showing a state in which the baking base plate is held.
Figure 11:
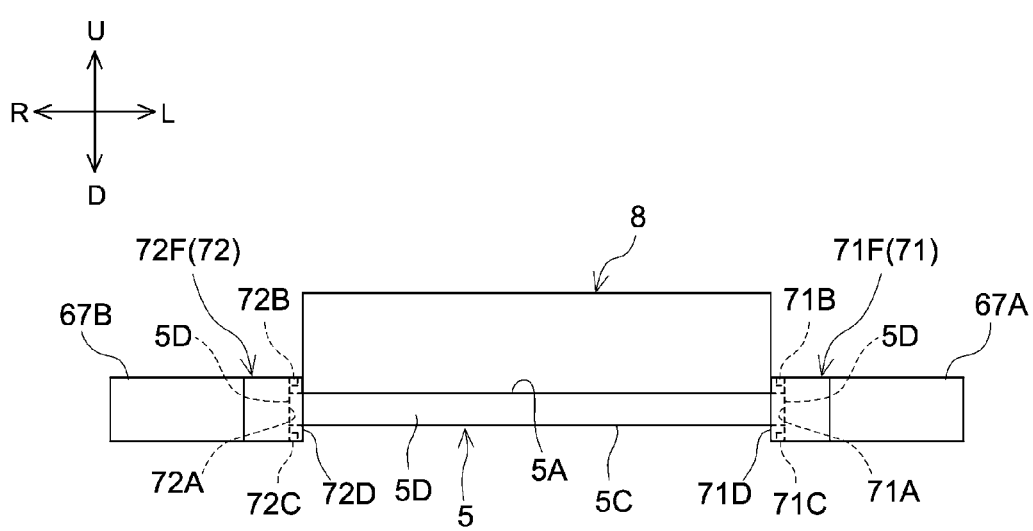
FIG. 11 is a front view schematically showing one part of the taking-out apparatus in accordance with one embodiment, and is a front view showing a state in which the baking base plate is held.

As shown in FIG. 10 and FIG. 11, the first holding member 71 and the second holding member 72 hold the baking base plate 5. At that time, the baking base plate 5 is held by the first held surface 71A of the first holding member 71 and the second held surface 72A of the second holding member 72. Herein, the protective members 80 (see FIG. 7) are provided on the first held surface 71A and the second held surface 72A, and thus the baking base plate 5 does not directly come into contact with the first holding member 71 and the second holding member 72 even when the baking base plate 5 at a high temperature is held. Therefore, it is possible to suppress malfunctions due to the heat on the first holding member 71 and the second holding member 72. As described above, the holding member 70 provided with the protective member 80 not only has superior heat resistance and superior corrosion resistance but also suppresses the outflow of the metal material due to the heat of the high temperature baking base plate 5, and thus it is possible to suppress the pollution of the baking base plate 5 due to the metal material. Incidentally, when the baking base plate 5 is held by the first holding member 71 and the second holding member 72, the first upper claw part 71B of the first holding member 71 and the second upper claw part 72B of the second holding member 72 are located at upward positions more than the disposing surface 5A of the baking base plate 5, the first lower claw part 71C of the first holding member 71 and the second lower claw part 72C of the second holding member 72 are located at downward positions more than the bottom surface 5C of the baking base plate 5, and the first middle claw part 71D of the first holding member 71 and the second middle claw part 72D of the second holding member 72 are located at front or rear positions more than the side surface 5D of the baking base plate 5. Normally, the first upper claw part 71B, the second upper claw part 72B, the first lower claw part 71C, the second lower claw part 72C, the first middle claw part 71D, and the second middle claw part 72D do not come into contact with the baking base plate 5.

Figure 12:
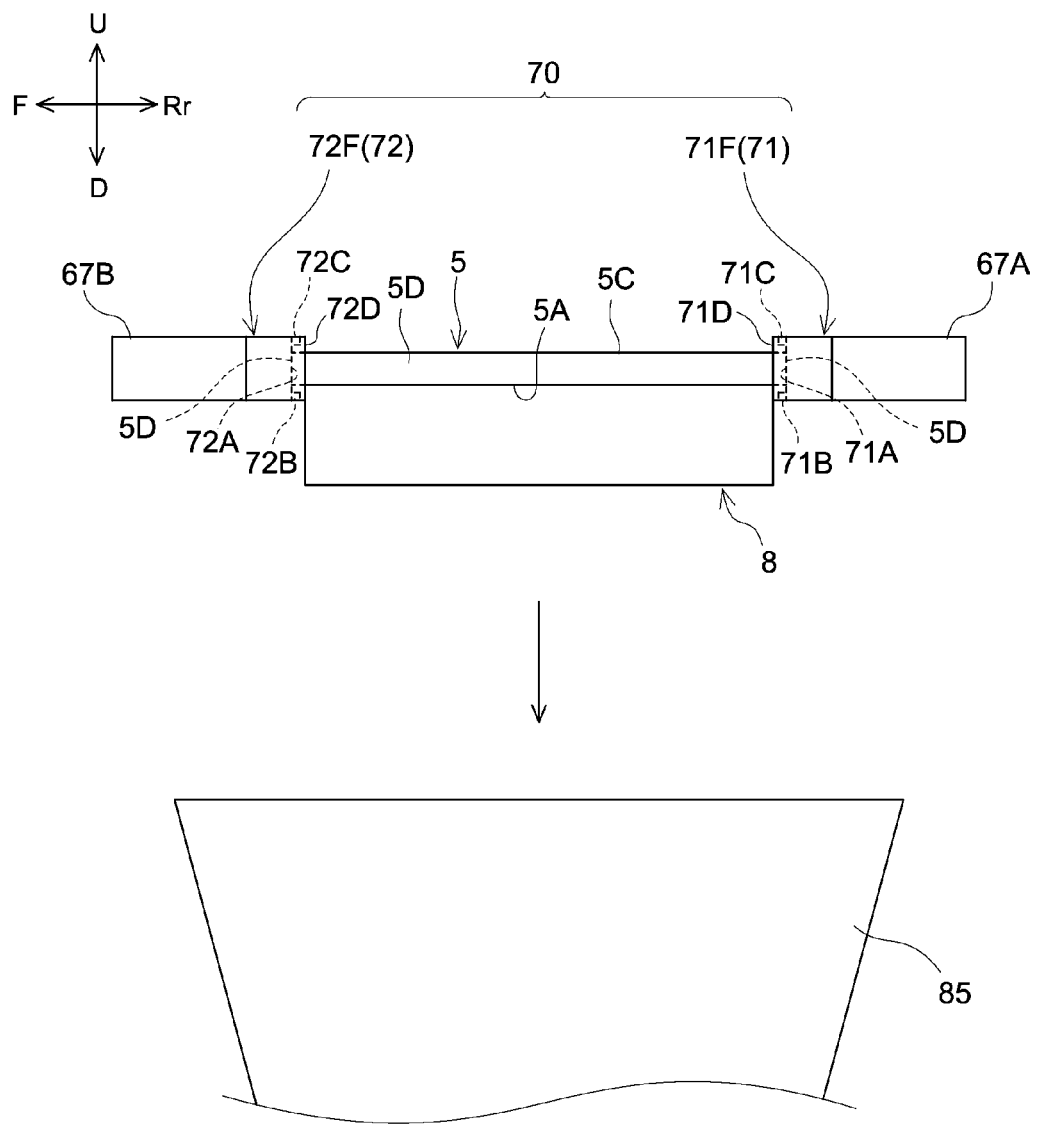
FIG. 12 is a side view showing a state in which the baking base plate is reversed at the upward position of a retrieving apparatus in accordance with one embodiment.

FIG. 12 is a side view showing a state where the baking base plate 5 is reversed at an upward position from the retrieving apparatus 85. Incidentally, FIG. 12 is a side view in the case where the right side of FIG. 1 is seen from the left side. As shown in FIG. 12, the robot arm 52 (see FIG. 6) is configured to be at least capable of tilting the baking base plate 5 by rotating the holding member 70 about a predetermined axis. Hereinafter, the robot arm 52 is configured to be capable of vertically reversing the baking base plate 5. The robot arm 52 rotates the sixth link 59 (see FIG. 6) about the sixth axis L6 so as to rotate the holding member 70 about the sixth axis L6. The retrieving apparatus 85 retrieves the baked object 8 disposed on the disposing surface 5A of the baking base plate 5. The retrieving apparatus 85 is formed in a mortar shape. As shown in FIG. 1, the retrieving apparatus 85 is provided at the left side from the robot arm 52. The retrieving apparatus 85 is provided at a downward position more than the position where the baking base plate 5 is tilted (hereinafter, position where the baking base plate 5 is reversed). In other words, the robot arm 52 rotates the holding member 70 at the upward position more than the retrieving apparatus 85 and vertically reverses the baking base plate 5 (in short, makes a state in which the disposing surface 5A looks downward). Thus, the baked object 8 disposed on the disposing surface 5A of the baking base plate 5 falls into the retrieving apparatus 85. Then, after the baked object 8 disposed on the baking base plate 5 is retrieved by the retrieving apparatus 85, the robot arm 52 rotates the holding member 70 so as to make the baking base plate 5 be in a previous state (in other words, a state in which the disposing surface 5A looks upward). Here, even in the case where deviation occurs on the baking base plate 5 when the baking base plate 5 is moved or reversed, it is possible to inhibit the baking base plate 5 from being fallen from the holding member 70, since the first upper claw part 71B, the first lower claw part 71C, and the first middle claw part 71D of the first holding member 71 and the second upper claw part 72B, the second lower claw part 72C, and the second middle claw part 72D of the second holding member 72 are provided.

Figure 13:
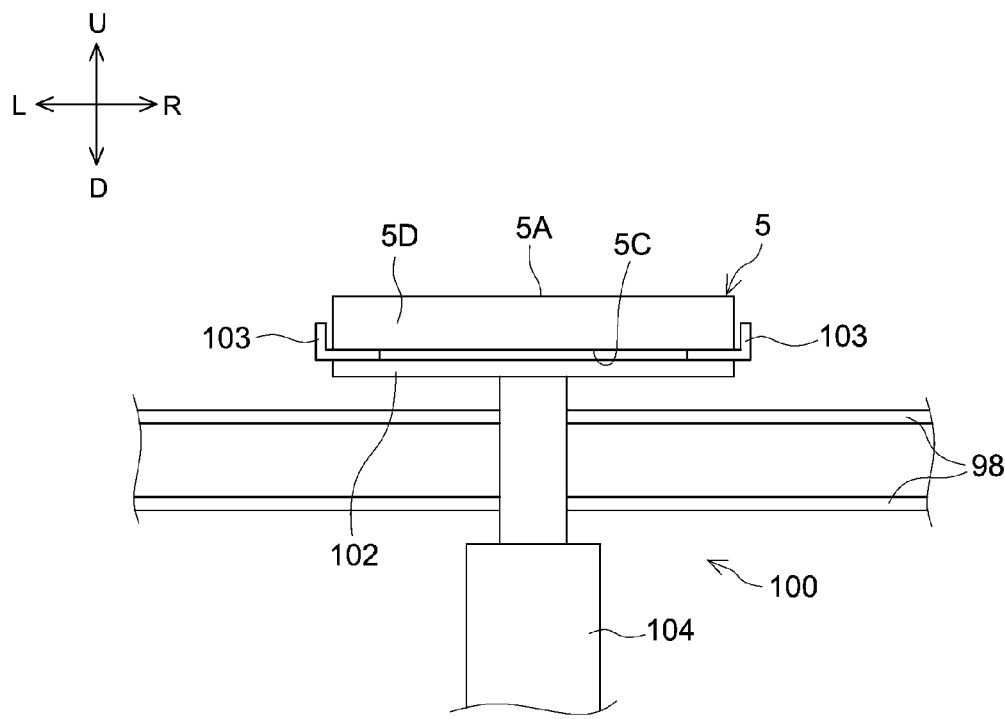
FIG. 13 is a side view schematically showing a second lifter in accordance with one embodiment.
Figure 14:
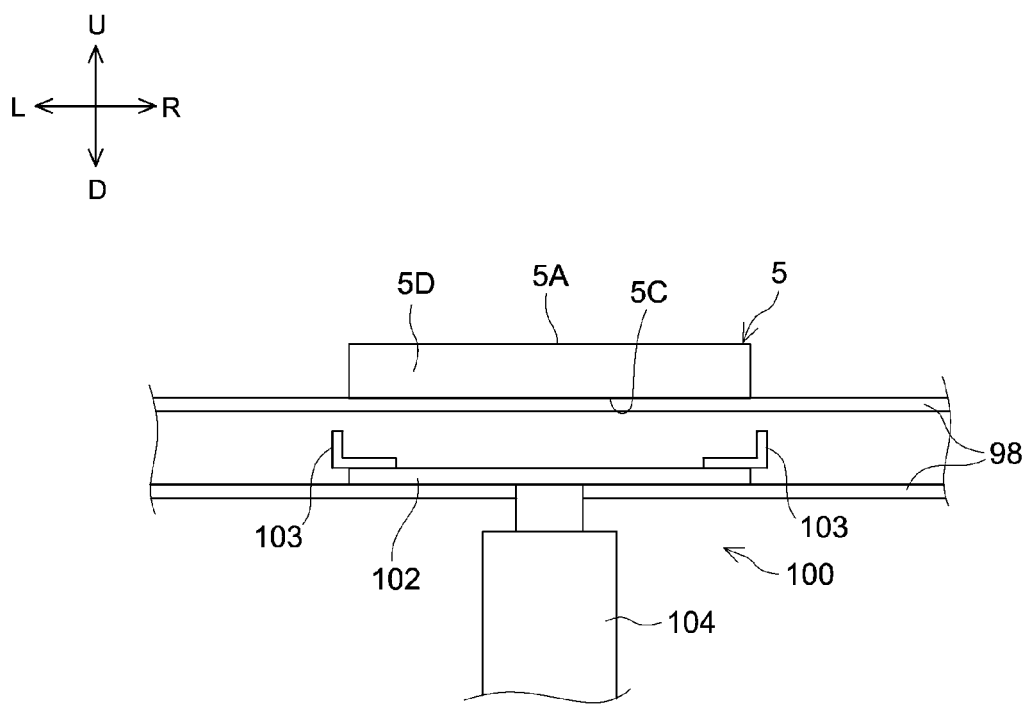
FIG. 14 is a side view schematically showing the second lifter in accordance with one embodiment, and is a side view showing a state in which the baking base plate is moved downward from the state shown in FIG. 11.

As shown in FIG. 1, the retrieving line 90 is provided at the downstream side of the baked object taking-out apparatus 50. The retrieving line 90 retrieves the baking base plate 5 sent from the baked object taking-out apparatus 50. The length of the retrieving line 90 in the longitudinal direction (hereinafter left and right direction) is longer than the length of the baking furnace 20 in the longitudinal direction (hereinafter left and right direction). The retrieving line 90 includes a second carrying mechanism 95 that carries the baking base plate 5 sent from the baked object taking-out apparatus 50, and includes a second lifter 100 on which the baking base plate 5 is disposed at the predetermined position of the second carrying mechanism 95. The second carrying mechanism 95 includes a drive axis 96 extending in the front and rear direction, a driven axis 97 extending in the front and rear direction, and a pair of belt members 98 extending in the left and right direction and being wound on the drive axis 96 and the driven axis 97. On the belt members 98, the baking base plate 5 is disposed. When the drive axis 96 is rotated, the belt members 98 travel in the left and right direction. This makes the baking base plate 5 disposed on the belt members 98 be carried. In other words, the baking base plate 5 is carried on the belt members 98. The second lifter 100 is arranged between the pair of belt members 98. The second lifter 100 is arranged at a right side portion more than the driven axis 97. As shown in FIG. 13, the second lifter 100 includes a second table 102 that is formed in a flat plate shape, a pair of guide members 103 that are provided on the second table 102 and whose cross section is formed in a L shape, and a second elevating mechanism 104 that moves the second table 102 in the up and down direction. On the second table 102, the baking base plate 5 is disposed. The second table 102 has a shape smaller than the bottom surface 5C of the baking base plate 5. In the present embodiment, the baking base plate 5 is disposed on the second table 102 via the guide members 103. Incidentally, the baking base plate 5 might be directly disposed on the second table 102, or disposed on a member provided on the second table 102, the member being different from the guide members 103. The second table 102 is connected to a portion above the second elevating mechanism 104. The guide member 103 is a member that suppresses the deviation of the baking base plate 5 when the baking base plate 5 held by the holding member 70 of the robot arm 52 is disposed on the second table 102. When the baking base plate 5 is disposed on the second table 102, the first lower claw part 71C and the second lower claw part 72C come into contact with the bottom surface 5C of the baking base plate 5, thus there are some fears of causing the position deviation of the baking base plate 5 by the friction, but the guide member 103 can suppress the position deviation of the baking base plate 5. The second elevating mechanism 104 is, for example, an air cylinder. It is configured that, when the baking base plate 5 is not disposed on the second table 102, the second elevating mechanism 104 moves the second table 102 upward so as to locate the second table 102 at an upward position more than the second carrying mechanism 95 (particularly, upward position more than the belt member 98). On the other hand, as shown in FIG. 14, it is configured that, when the baking base plate 5 is disposed on the second table 102, the second elevating mechanism 104 moves the second table 102 downward (particularly, to a downward position more than the belt member 98). Herein, the second table 102 is smaller than the bottom surface 5C of the baking base plate 5, thus the second table 102 passes through the belt member 98 and moves downward but the baking base plate 5 comes into contact with the belt member 98 when the second table 102 is lowered down by the second elevating mechanism 104. As described above, the baking base plate 5 is disposed on the belt member 98.

In the above described embodiment, the protective member 80 is formed only on one part of the holding member 70, but the present disclosure is not restricted to this. For example, the protective member 80 might be formed on the whole of the holding member 70. In other words, the protective member 80 might be formed even on a portion of the holding member 70 that does not come into contact with the baking base plate 5.

In the above described embodiment, the robot arm 52 rotates the holding member 70 above the retrieving apparatus 85 and vertically reverses the baking base plate 5 so as to move the baked object 8 into the retrieving apparatus 85, but it is also allowed that, for example, tilting the baking base plate 5 by a predetermined angle make the baked object 8 slide from the baking base plate 5 and be moved into the retrieving apparatus 85.

Figure 15:
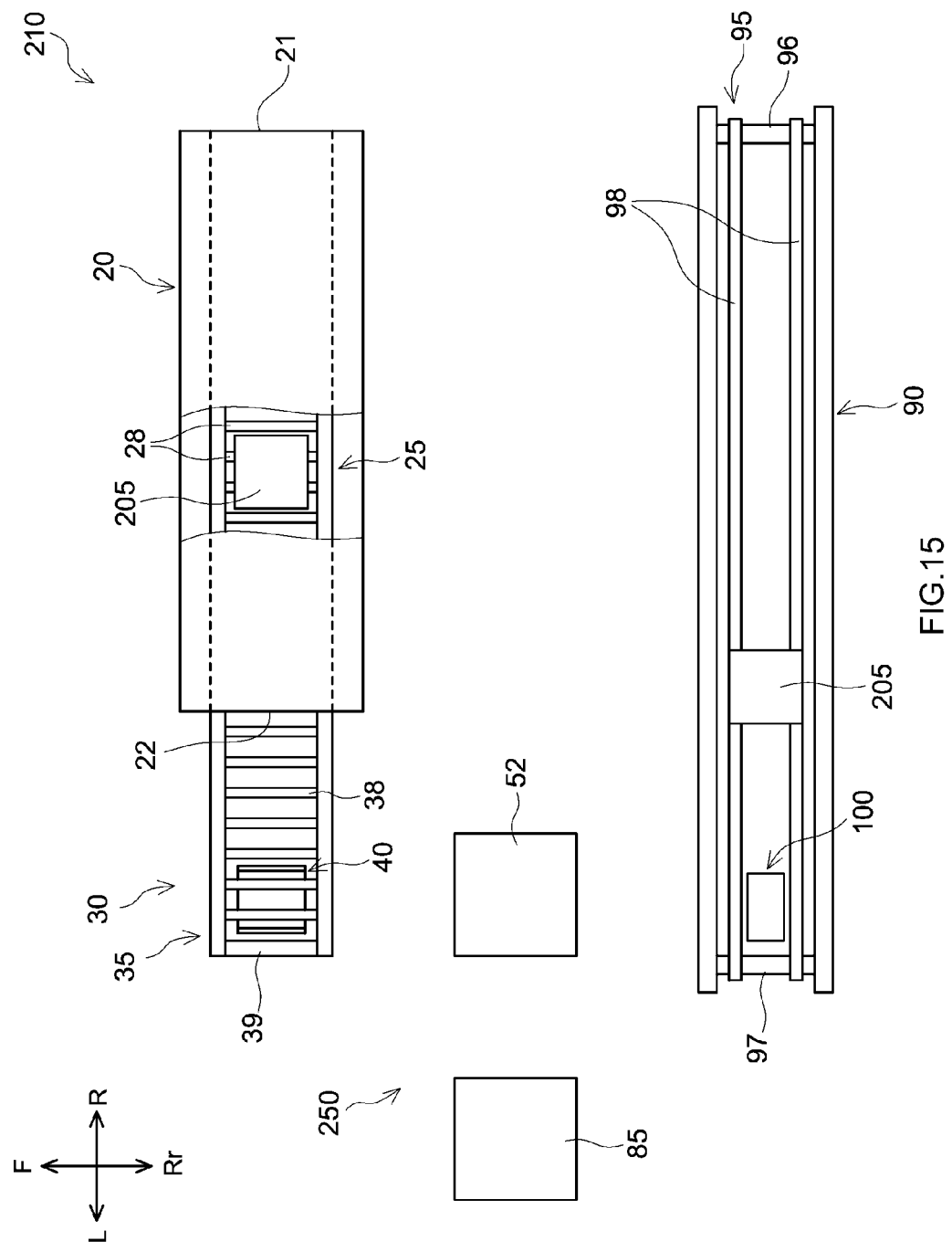
FIG. 15 is a plane view schematically showing a baking system in accordance with one embodiment.

FIG. 15 is a plane view schematically showing a baking system 210 in accordance with another embodiment. The baking system 210 includes a baking furnace 20, a carrying line 30, a baked object taking-out apparatus 250, and a retrieving line 90. The baking system 210 uses a baking container 205 (see FIG. 16, too) that accommodates the baked object. The baking container 205 is configured to be capable of repeatedly moving between the baking furnace 20, the carrying line 30, the baked object taking-out apparatus 250, and the retrieving line 90, in this order. In other words, the baking container 205 is repeatedly used in the baking system 210. In the present embodiment, with respect to the direction (flow direction) in which the baking container 205 is carried, the baking furnace 20 is arranged at the most upstream side and the retrieving line 90 is arranged at the most downstream side.

Figure 16:
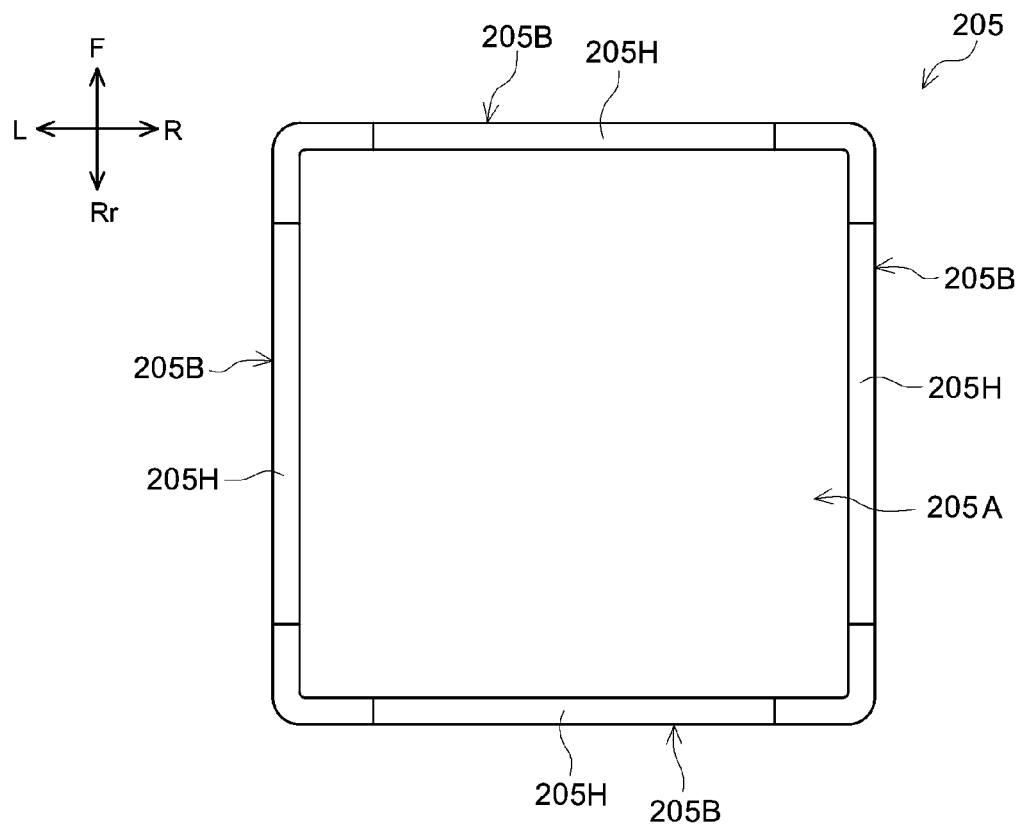
FIG. 16 is a plane view schematically showing a baking container in accordance with one embodiment.
Figure 17:
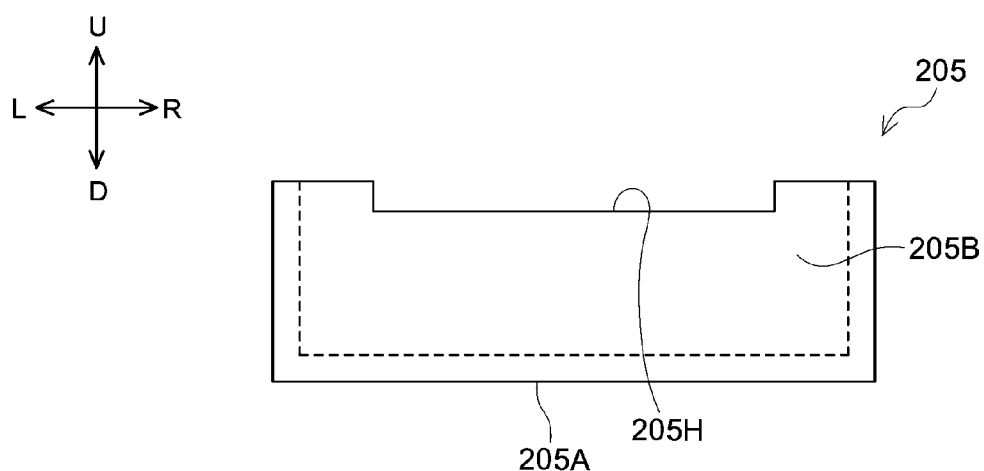
FIG. 17 is a side view schematically showing the baking container in accordance with one embodiment.

FIG. 16 is a plane view of the baking container 205. FIG. 17 is a side view of the baking container 205. As shown in FIG. 16 and FIG. 17, the baking container 205 is formed in a box shape whose upper surface is opened. The baking container 205 accommodates the baked object. The baking container 205 is formed from a material superior to the heat resistance (fire resistance). The baking container 205 can be formed from a material similar to the material forming the baking base plate 5. The baking container 205 includes a bottom surface part 205A having a rectangular shape, and four side surface parts 205B extending upward from the bottom surface part 205A. A recessed part 205H is formed on the side surface part 205B, which is recessed downward. Since the recessed part 205H is formed on the baking container 205, a gap is formed between the upper side baking container 205 and the lower side baking container 205 when a plurality of baking containers 205 are stacked in the up and down direction.

The baking furnace 20 bakes the baked object accommodated in the baking container 205 (see FIG. 16). The baking furnace 20 of the present embodiment is a continuous baking furnace that carries a plurality of baking containers 205 on the carrying passage 25 and continuously bakes the baked objects accommodated in the baking container 205.

Figure 18:
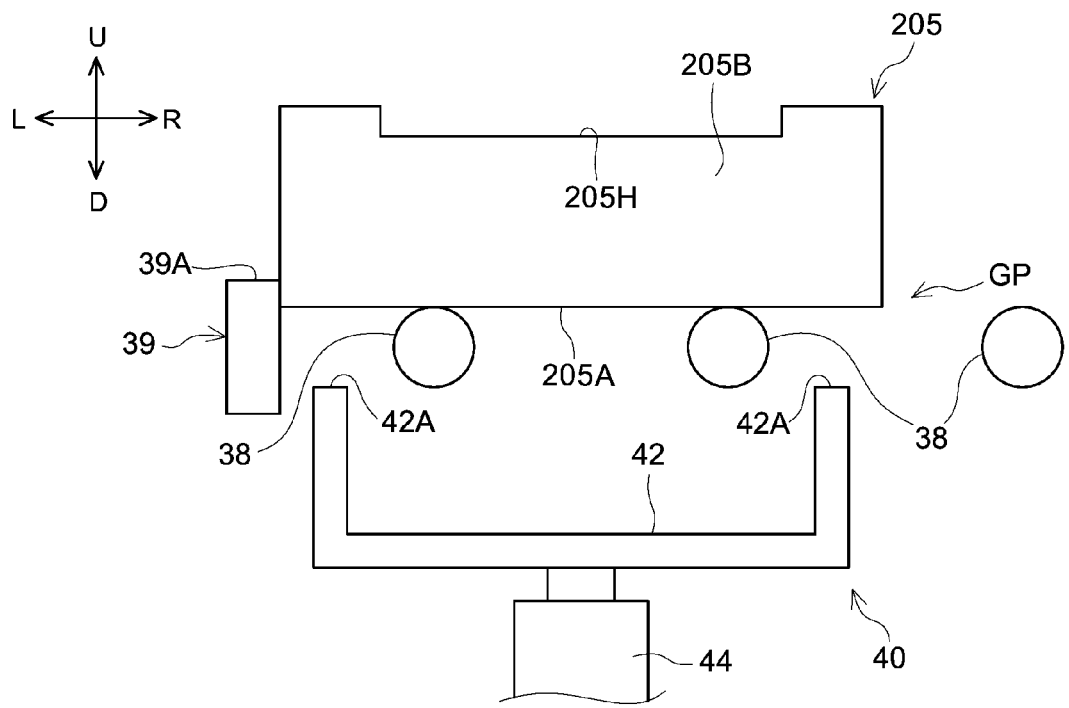
FIG. 18 is a side view schematically showing the first lifter in accordance with one embodiment.
Figure 19:
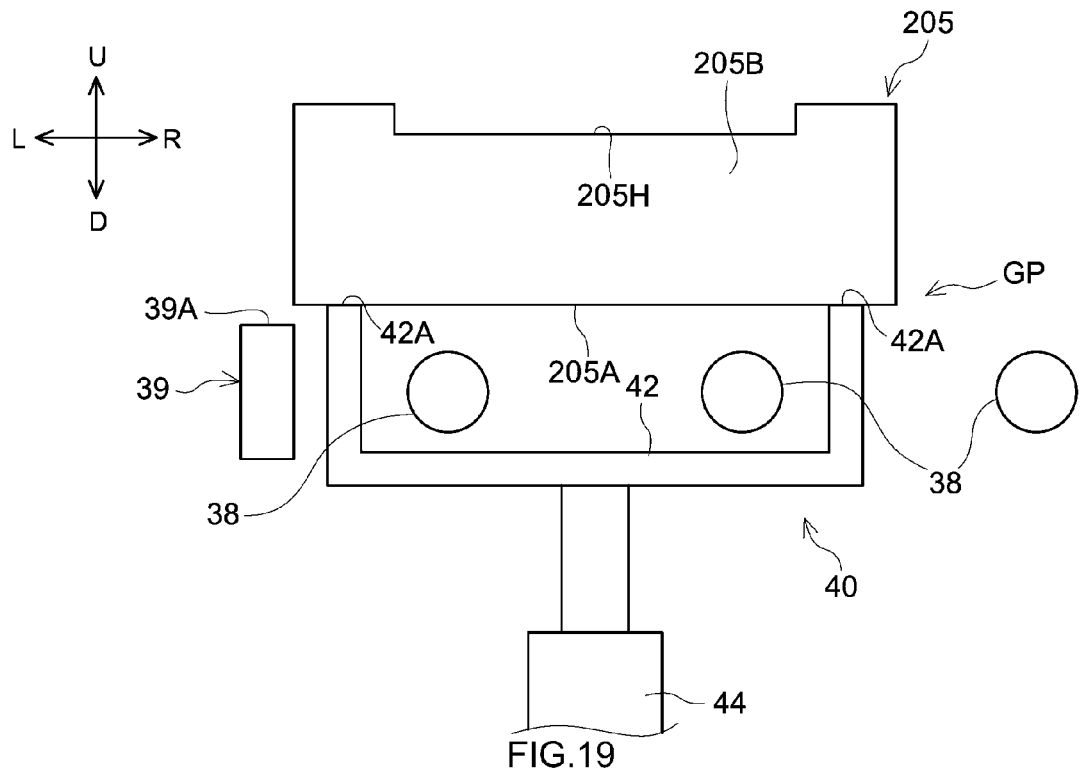
FIG. 19 is a side view schematically showing the first lifter in accordance with one embodiment, and is a side view showing a state in which the baking container is lifted upward from the state shown in FIG. 18.

As shown in FIG. 15, the carrying line 30 is provided at the downstream side of the baking furnace 20. The length of the carrying line 30 in the longitudinal direction (hereinafter, left and right direction) is shorter than the length of the baking furnace 20 in the longitudinal direction (hereinafter, left and right direction). The carrying line 30 includes a first carrying mechanism 35 that carries the baking container 205 carried out from the baking furnace 20, a stopper 39 that stops the movement of the baking container 205 at a predetermined position of the first carrying mechanism 35, and a first lifter 40 that moves the baking container 205 to an upper portion more than the first carrying mechanism 35. The first carrying mechanism 35 includes a plurality of carrying rollers 38 that are arranged at predetermined intervals. The baking container 205 is carried on the carrying rollers 38. As shown in FIG. 18, the stopper 39 is arranged at the downstream side more than the first lifter 40. The top end 39A of the stopper 39 is located at an upward position more than the carrying rollers 38. The stopper 39 is configured to stop the baking container 205, carried on the carrying roller 38, at a holding position GP. The first lifter 40 includes a first table 42 whose cross section is formed in a U shape, and a first elevating mechanism 44 that moves the first table 42 in the up and down direction. The top end 42A of the first table 42 is configured to be capable of coming into contact with the bottom surface part 205A of the baking container 205. The first table 42 is connected to a portion above the first elevating mechanism 44. The first elevating mechanism 44 is, for example, an air cylinder. It is configured that, before the baking container 205 reaches the holding position GP, the first elevating mechanism 44 makes the first table 42 move downward so as to locate the top end 42A of the first table 42 at a lower position more than the carrying roller 38. On the other hand, as shown in FIG. 19, it is configured that, when the baking container 205 locating at the holding position GP is moved upward, the first elevating mechanism 44 makes the first table 42 move upward so as to locate the top end 42A of the first table 42 at an upward position more than the carrying roller 38 and the stopper 39. Thus, the bottom surface part 205A of the baking container 205 is located at the upper position more than the carrying roller 38 and the stopper 39, and therefore the baking container 205 is easily held by a holding member 270 described later of the baked object taking-out apparatus 250.

As shown in FIG. 15, the baked object taking-out apparatus 250 is provided at a downstream side of the carrying line 30. The baked object taking-out apparatus 250 is an apparatus that takes out the baked object from the baking container 205. The baked object taking-out apparatus 250 includes a robot arm 52, a holding member 270 (see FIG. 22), a protective member 80 (see FIG. 22), and a retrieving apparatus 85.

Figure 20:
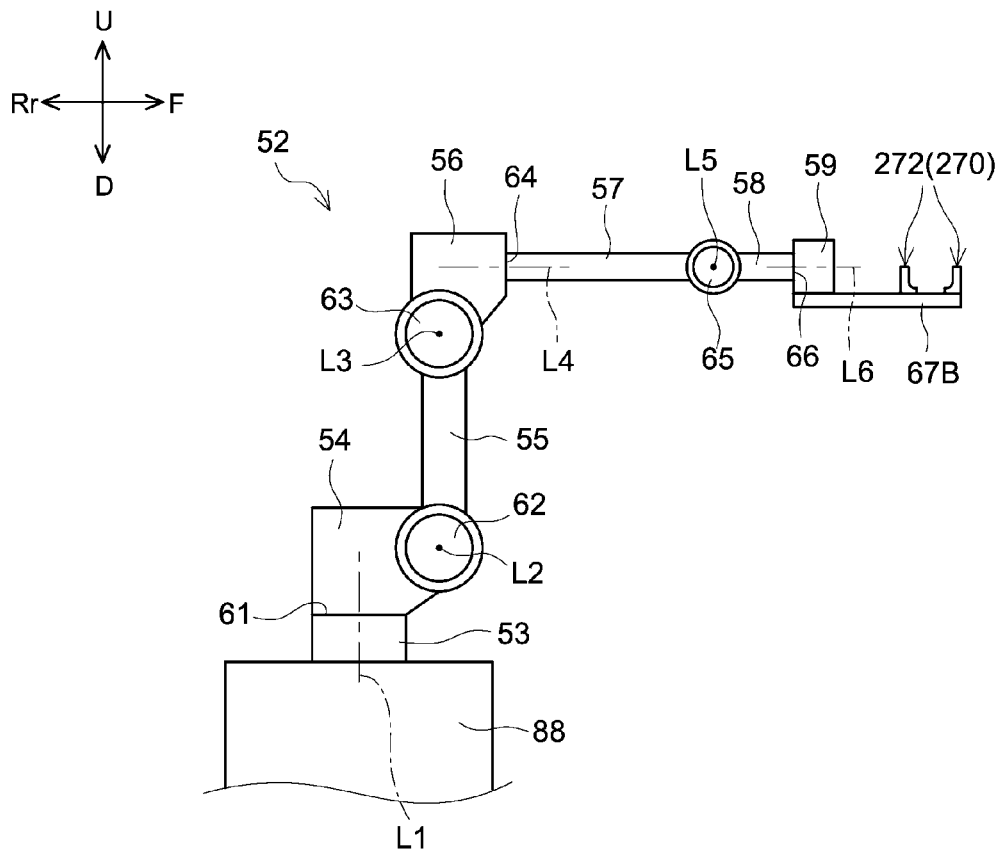
FIG. 20 is a side view schematically showing one part of the taking-out apparatus in accordance with one embodiment.

As shown in FIG. 20, the robot arm 52 is a 6-axis vertical articulated robot. The robot arm 52 is arranged on a robot pedestal 88. The robot arm 52 includes a base member 53, a first link 54, a second link 55, a third link 56, a fourth link 57, a fifth link 58, a sixth link 59, a first joint 61, a second joint 62, a third joint 63, a fourth joint 64, a fifth joint 65, and a sixth joint 66.

Figure 21:
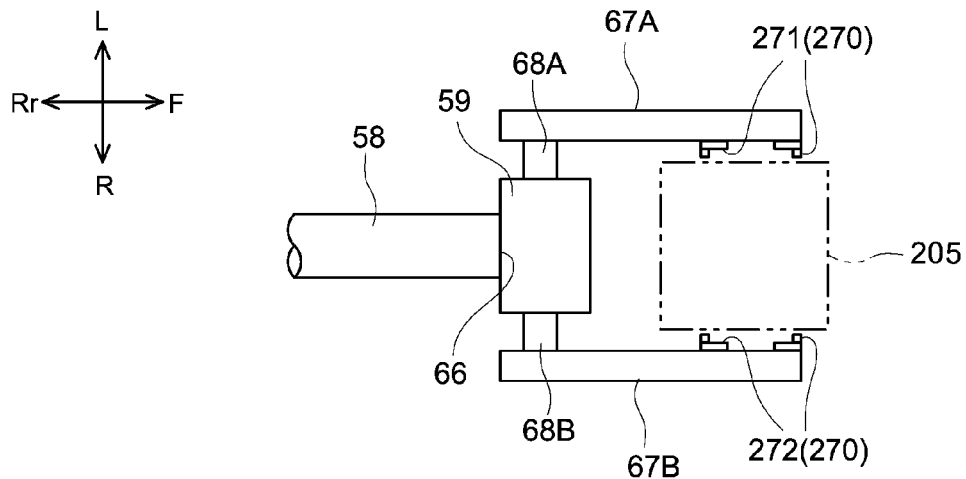
FIG. 21 is a plane view schematically showing one part of the taking-out apparatus in accordance with one embodiment.

The holding member 270 is configured to be capable of holding the baking container 205. The holding member 270 is provided on the robot arm 52. More particularly, as shown in FIG. 21, the holding member 270 are provided on the first arm part 67A and second arm part 67B of the sixth link 59. The holding member 270 is formed of a metal material. The holding member 270 can be formed of a metal material similar to the holding member 270 of the baked object taking-out apparatus 250. The holding member 270 includes a first holding member 271, and a second holding member 272 provided at a position opposed to the first holding member 271. The first holding member 271 and the second holding member 272 are aligned in the left and right direction. The first holding member 271 is provided on the first arm part 67A. Hereinafter, two first holding members 271 are provided on the first arm part 67A. The second holding member 272 is provided on the second arm part 67B. Hereinafter, two second holding members 272 are provided on the second arm part 67B.

Figure 22:
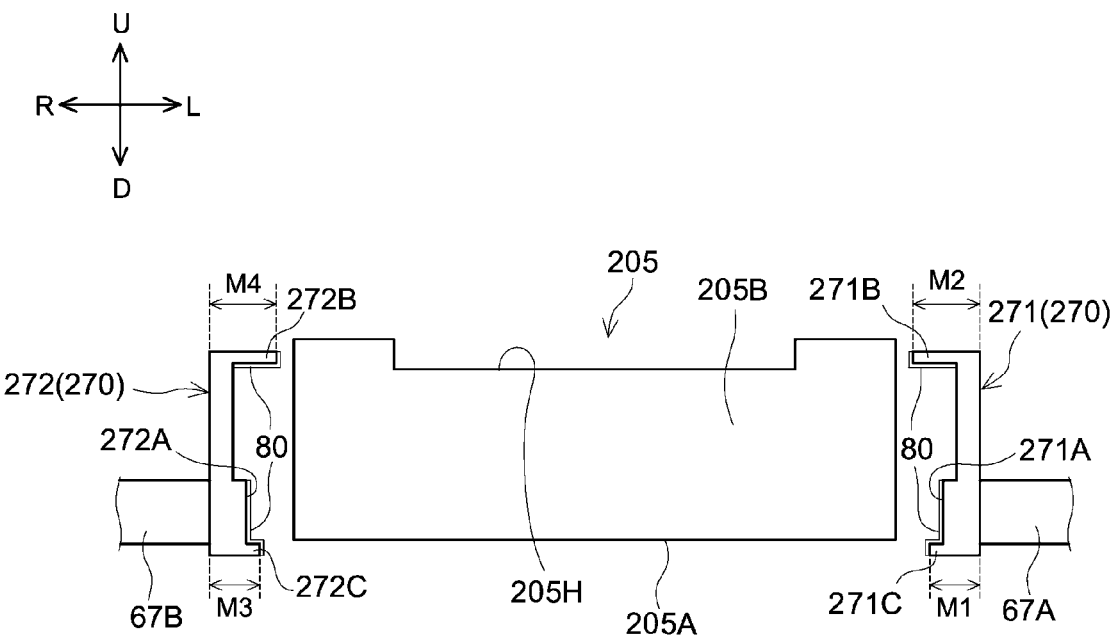
FIG. 22 is a side view schematically showing a first holding member and a second holding member in accordance with one embodiment.
Figure 23:
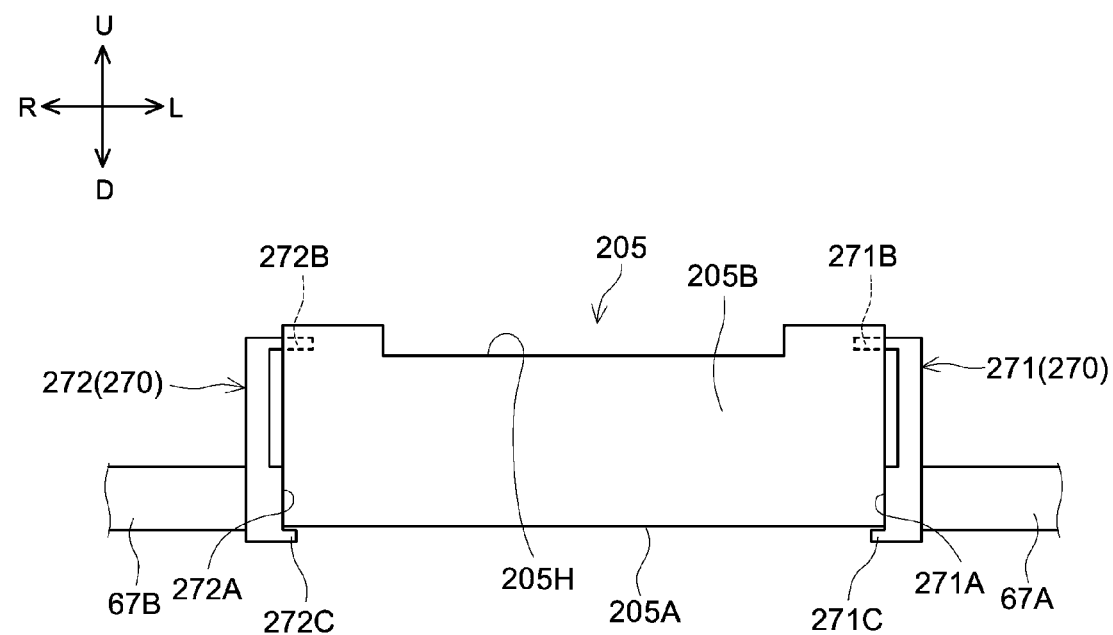
FIG. 23 is a side view showing a state in which the first holding member and the second holding member in accordance with one embodiment hold the baking container.

FIG. 22 is a side view schematically showing the first holding member 271 and the second holding member 272. FIG. 23 is a side view showing a state where the first holding member 271 and the second holding member 272 hold the baking container 205. Incidentally, FIG. 22 and FIG. 23 are side views in the case where the rear side of FIG. 15 is seen from the front side. As shown in FIG. 22, the first holding member 271 includes a first held surface 271A that comes into contact with the baking container 205, a first upper claw part 271B that is located at an upward position more than the first held surface 271A and that protrudes toward the second holding member 272 (hereinafter, toward the right) more than the first held surface 271A, and a first lower claw part 271C that is located at a downward position more than the first held surface 271A and that protrudes toward the second holding member 272 more than the first held surface 271A. The first held surface 271A indirectly comes into contact with the baking container 205 (particularly, the side surface part 205B of the baking container 205) via the protective member 80. The length M1 of the first lower claw part 271C in the left and right direction is shorter than the length M2 of the first upper claw part 271B in the left and right direction. The left and right direction is an example of the first direction.

As shown in FIG. 22, the second holding member 272 includes a first held surface 271A that comes into contact with the baking container 205, a second upper claw part 272B that is located at an upward position more than the second held surface 272A and that protrudes toward the first holding member 271 (hereinafter, toward the left) more than the second held surface 272A, and a second lower claw part 272C that is located at a downward position more than the second held surface 272A and protrudes toward the first holding member 271 more than the second held surface 272A. The second held surface 272A indirectly comes into contact with the baking container 205 (particularly, the side surface part 205B of the baking container 205) via the protective member 80. The length M3 of the second lower claw part 272C in the left and right direction is shorter than the length M4 of the second upper claw part 272B in the left and right direction.

As shown in FIG. 22, the protective member 80 is formed at a portion of the holding member 270 which comes into contact with the baking container 205. The protective member 80 can be configured with a ceramic coating film similar to the protective member 80 formed on the holding member 70 of the baked object taking-out apparatus 50. In the present embodiment, the protective members 80 are formed on the first held surface 271A, first upper claw part 271B, and first lower claw part 271C of the first holding member 271, and on the second held surface 272A, second upper claw part 272B, and second lower claw part 272C of the second holding member 272. The first held surface 271A and the second held surface 272A indirectly come into contact with the baking container 205 via the protective member 80. The first upper claw part 271B, the first lower claw part 271C, the second upper claw part 272B, and the second lower claw part 272C indirectly come into contact with the baking container 205 via the protective member 80. Incidentally, except for FIG. 22, illustrations of the protective members 80 are omitted for convenience sake.

As shown in FIG. 23, the first holding member 271 and the second holding member 272 hold the baking container 205. At that time, the baking container 205 is held by the first held surface 271A of the first holding member 271 and the second held surface 272A of the second holding member 272. Herein, the protective members 80 (see FIG. 22) are provided on the first held surface 271A and the second held surface 272A, and thus the baking container 205 does not directly come into contact with the first holding member 271 and the second holding member 272 even when the baking container 205 at a high temperature is held. Thus, it is possible to suppress malfunctions due to the heat on the first holding member 271 and the second holding member 272. As described above, the holding member 270 provided with the protective member 80 not only has superior heat resistance and superior corrosion resistance but also suppresses the outflow of the metal material due to the heat of the high temperature baking container 205, and thus it is possible to suppress the pollution of the baking container 205 caused by the metal material. Incidentally, when the baking container 205 is held by the first holding member 271 and the second holding member 272, the first upper claw part 271B of the first holding member 271 and the second upper claw part 272B of the second holding member 272 are located at positions within the recessed part 205H of the baking container 205, and the first lower claw part 271C of the first holding member 271 and the second lower claw part 272C of the second holding member 272 are located at lower portions more than the bottom surface part 205A of the baking container 205. Normally, the first upper claw part 271B, the second upper claw part 272B, the first lower claw part 271C, and the second lower claw part 272C do not come into contact with the baking container 205.

FIG. 24 is a side view showing a state where the baking container 205 is reversed at an upward position from the retrieving apparatus 85. Incidentally, FIG. 24 is a side view in the case where the right side of FIG. 15 is seen from the left side. As shown in FIG. 24, the robot arm 52 (see FIG. 20) is configured to be capable of vertically reversing the baking container 205 by rotating the holding member 270. The robot arm 52 rotates the sixth link 59 (see FIG. 20) about the sixth axis L6 so as to rotate the holding member 270. The retrieving apparatus 85 retrieves the baked object accommodated in the baking container 205. The retrieving apparatus 85 is formed in a mortar shape. As shown in FIG. 15, the retrieving apparatus 85 is provided at the left side from the robot arm 52. The retrieving apparatus 85 is provided below a position where the baking container 205 is reversed. In other words, the robot arm 52 rotates the holding member 270 at the upward position of the retrieving apparatus 85 and vertically reverses the baking container 205 (in short, makes a state in which the opening looks downward). Then, after the baked object accommodated in the baking container 205 is retrieved by the retrieving apparatus 85, the robot arm 52 rotates the holding member 270 so as to make the baking container 205 be in a previous state (in other words, a state in which the opening looks upward). Here, even in the case where deviation occurs on the baking container 205 when the baking container 205 is moved or reversed, it is possible to inhibit the baking container 205 from being fallen from the holding member 270, since the first upper claw part 271B and first lower claw part 271C of the first holding member 271 and the second upper claw part 272B and second lower claw part 272C of the second holding member 272 are provided.

Figure 25:
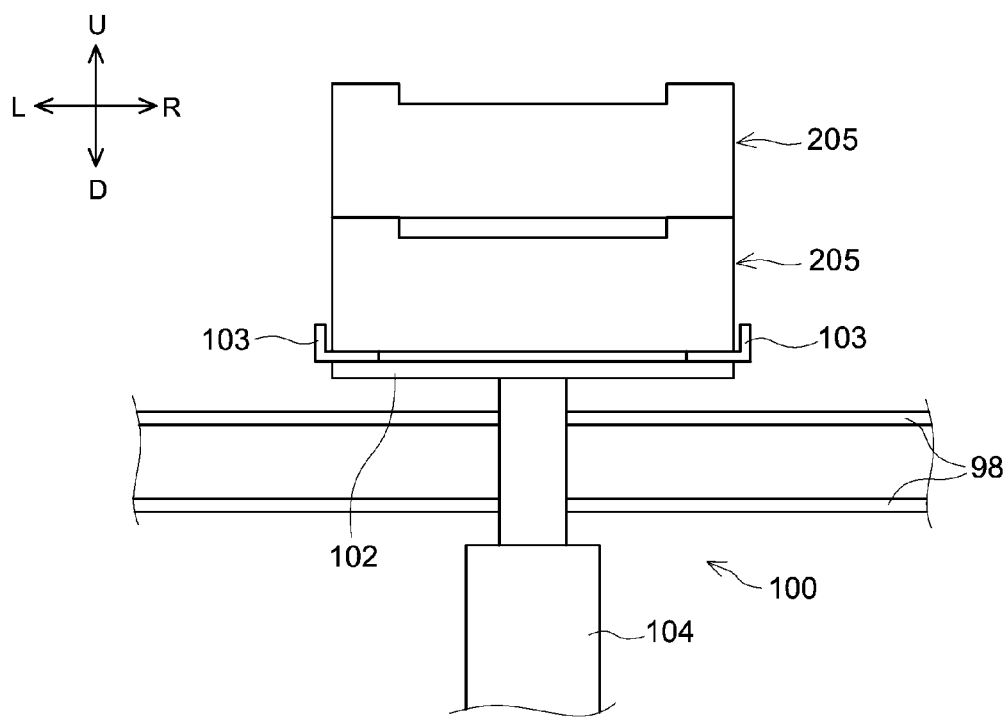
FIG. 25 is a side view schematically showing the second lifter in accordance with one embodiment.
Figure 26:
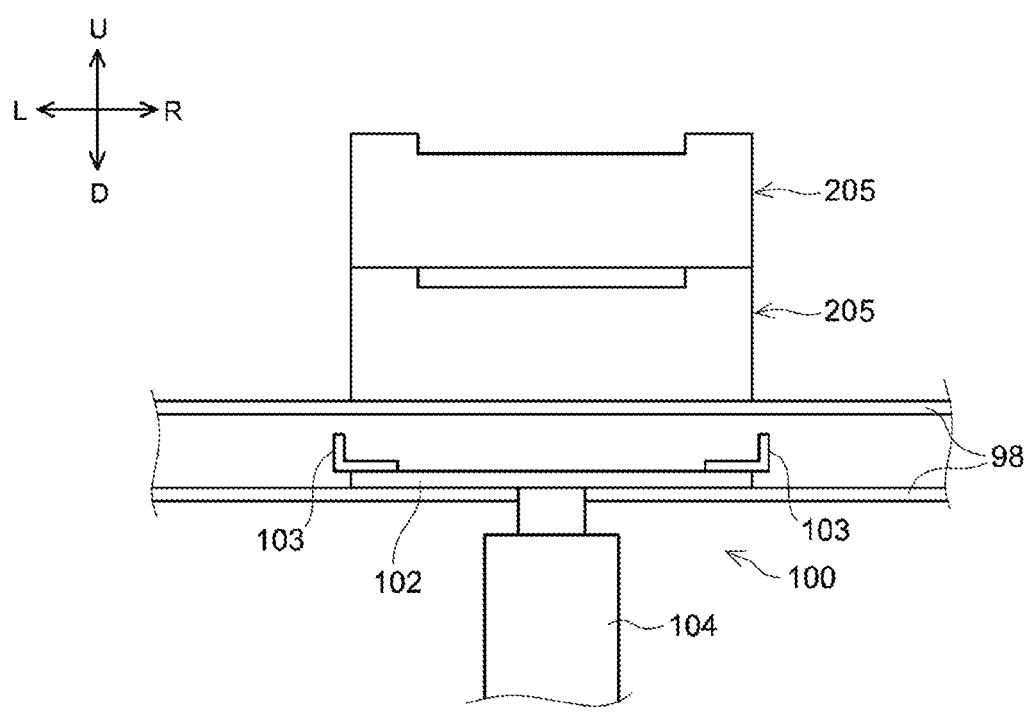
FIG. 26 is a side view schematically showing the second lifter in accordance with one embodiment, and is a side view showing a state in which the baking containers overlaid in two stages are moved downward from the state shown in FIG. 25.

As shown in FIG. 15, the retrieving line 90 is provided at the downstream side of the baked object taking-out apparatus 250. The retrieving line 90 includes a second carrying mechanism 95 that carries the baking container 205 sent from the baked object taking-out apparatus 250, and a second lifter 100 on which the baking container 205 is disposed at the predetermined position of the second carrying mechanism 95. As shown in FIG. 25, the second lifter 100 includes a second table 102 formed in a flat plate shape, a pair of guide members 103 that are provided on the second table 102 and whose cross sections are formed in L shapes, and a second elevating mechanism 104 that moves the second table 102 in the up and down direction. On the second table 102, the baking container 205 is disposed. The second table 102 has a shape smaller than the bottom surface part 205A of the baking container 205. In the present embodiment, the baking container 205 is disposed on the second table 102 via the guide members 103. Incidentally, the baking container 205 might be directly disposed on the second table 102, or disposed on a member, different from the guide members 103, provided on the second table 102. It is configured that, when the baking container 205 is not disposed on the second table 102 and baking containers 205 equal to or less than a predetermined number (e.g., 1) are arranged on the second table 102, the second elevating mechanism 104 moves the second table 102 upward so as to locate the second table 102 at an upward position more than the second carrying mechanism 95 (particularly, upward position more than the belt member 98). On the other hand, as shown in FIG. 26, it is configured that, when a predetermined number (e.g., 2) of baking containers 205 are disposed on the second tables 102, the second elevating mechanism 104 moves the second table 102 downward (particularly, to a downward position more than the belt member 98). Herein, the second table 102 is smaller than the bottom surface part 205A of the baking container 205, thus the second table 102 passes through the belt member 98 and moves downward but the baking container 205 comes into contact with the belt member 98 when the second table 102 is lowered down by the second elevating mechanism 104. As described above, the baking containers 205 stacked in two stages are disposed on the belt member 98.

Figure 27:
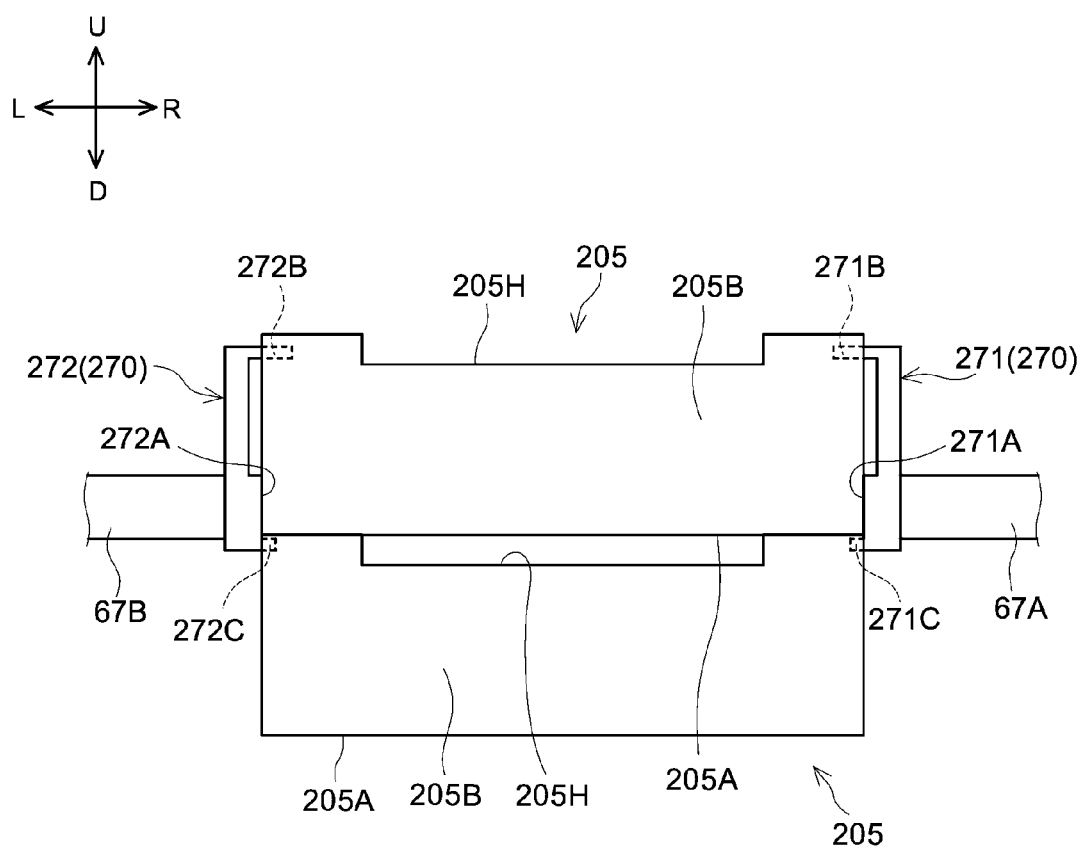
FIG. 27 is a side view showing a state in which another baking container is stacked up on the baking container.

Incidentally, in the case where the baking container 205 of the present embodiment is used, as shown in FIG. 27, it is possible to stack another baking container 205 on the already disposed baking container 205. At that time, the first lower claw part 271C of the first holding member 271 and the second lower claw part 272C of the second holding member 272 that hold the upper side baking container 205 are located at the recessed part 205H of the lower side baking container 205. As described above, the first lower claw part 271C and the second lower claw part 272C do not interfere with the lower side baking container 205, and thus it is possible to properly stack the baking container 205 on the lower side baking container 205.

In the above described embodiment, with respect to the retrieving line 90, it is configured that two baking containers 205 are stacked in the up and down direction, but the present disclosure is not restricted to this. Three or more (e.g., 5 to 10) baking containers 205 might be stacked in the up and down direction.

Up to this point, a detailed description has been given by way of specific embodiments, which are merely illustrative, and is not construed as limiting the scope of the appended claims. In addition, the contents disclosed herein can be variously changed, and each of configuration elements and each of processes described here can be appropriately omitted or appropriately combined unless there are no special issues.

What is claimed is:

1. A baked object taking-out apparatus for taking out a baked object from a baking base plate having a disposing surface on which the baked object is disposed, the baked object taking-out apparatus comprising:
   a robot arm;
   a holding member on the robot arm, the holding member being formed of a metal material and being configured to hold the baking base plate;
   a protective member formed at a portion of the holding member, the protective member being arranged to come into contact with the baking base plate and having a ceramic coating containing a ceramic component; and
   a retrieving apparatus below a position where the baking base plate is tilted and configured to retrieve the baked object disposed on the baking base plate,
   wherein the robot arm is configured to at least tilt the baking base plate by rotating the holding member about a predetermined axis,
   wherein the holding member comprises a first holding member and a second holding member, the second holding member being opposed to the first holding member in a first direction,
   wherein the first holding member comprises a first held surface contacting the baking base plate, a first upper claw part located at an upward position more than the first held surface and protruding toward the second holding member more than the first held surface, and a first lower claw part located at a downward position more than the first held surface and protruding toward the second holding member more than the first held surface,
   wherein the second holding member comprises a second held surface contacting the baking base plate, a second upper claw part located at an upward position more than the second held surface and protruding toward the first holding member more than the second held surface, and a second lower claw part located at a downward position more than the second held surface and protruding toward the first holding member more than the second held surface,
   wherein the first holding member comprises a first middle claw part located at least between the first upper claw part and the first lower claw part with respect to an up and down direction, the first middle claw part protruding from the first held surface to the second holding member, the first middle claw part being, with respect to a second direction crossing to the first direction in a plane view, located at one side in the second direction more than an end part at one side in the second direction of the baking base plate when the baking base plate comes into contact with the first held surface, and
   wherein the second holding member comprises a second middle claw part located at least between the second upper claw part and the second lower claw part in the up and down direction, the second middle claw part protruding from the second held surface to the first holding member, the second middle claw part being, with respect to the second direction in a plane view, located at one side in the second direction more than an end part at one side in the second direction of the baking base plate when the baking base plate comes into contact with the second held surface.

2. The baked object taking-out apparatus according to claim 1,
   wherein a length of the first middle claw part in the first direction is longer than lengths of the first upper claw part and the first lower claw part in the first direction, and
   wherein a length of the second middle claw part in the first direction is longer than lengths of the second upper claw part and the second lower claw part in the first direction.

3. A baked object taking-out apparatus for taking out a baked object from a baking container whose upper surface is opened, the baked object taking-out apparatus comprising:
   a robot arm;
   a holding member on the robot arm, the holding member being formed of a metal material and being configured to hold the baking container;
   a protective member formed at a portion of the holding member, the protective member being arranged to come into contact with the baking container and having a ceramic coating containing a ceramic component;
   a retrieving apparatus configured to retrieve the baked object accommodated in the baking container, and
   an additional baking container,
   wherein the robot arm is configured to vertically reverse the baking container above the retrieving apparatus by rotating the holding member,
   wherein the holding member comprises a first holding member and a second holding member opposed to the first holding member,
   wherein the first holding member comprises a first held surface arranged to come into contact with the baking container, a first upper claw part located upwardly of the first held surface and protruding toward the second holding member more than the first held surface, and a first lower claw part located at a downward position more than the first held surface and protruding toward the second holding member more than the first held surface,
   wherein the second holding member comprises a second held surface arranged to come into contact with the baking container, a second upper claw part located upwardly of the second held surface and protruding toward the first holding member more than the second held surface, and a second lower claw part located at a downward position more than the second held surface and protruding toward the first holding member more than the second held surface,
   wherein the baking container comprises a bottom surface part having a rectangular shape and four side surface parts extending upward from the bottom surface part,
   wherein on each of the side surface parts, a recessed part being recessed downward is formed, and wherein the first lower claw part of the first holding member and the second lower claw part of the second holding member hold the additional baking container stacked on the baking container in an up and down direction and are located at recessed, lower side parts of the baking container.

4. The baked object taking-out apparatus according to claim 3,
wherein a length of the first lower claw part in a first direction in which the first holding member and the second holding member are aligned is shorter than a length of the first upper claw part in the first direction in which the first holding member and the second holding member are aligned, and
wherein a length of the second lower claw part in the first direction in which the first holding member and the second holding member are aligned is shorter than a length of the second upper claw part in the first direction in which the first holding member and the second holding member are aligned.

* * * * *